United States Patent
Sasaki et al.

(10) Patent No.: US 7,640,164 B2
(45) Date of Patent: Dec. 29, 2009

(54) SYSTEM FOR PERFORMING INTERACTIVE DIALOG

(75) Inventors: Mikio Sasaki, Kariya (JP); Ryuichi Suzuki, Okazaki (JP)

(73) Assignee: Denso Corporation, Kariya (JP)

( * ) Notice: Subject to any disclaimer, the term of this patent is extended or adjusted under 35 U.S.C. 154(b) by 709 days.

(21) Appl. No.: 10/608,002

(22) Filed: Jun. 30, 2003

(65) Prior Publication Data

US 2004/0006483 A1   Jan. 8, 2004

(30) Foreign Application Priority Data

| Jul. 4, 2002 | (JP) | ............................. 2002-195904 |
| Jul. 29, 2002 | (JP) | ............................. 2002-219764 |
| Sep. 17, 2002 | (JP) | ............................. 2002-269941 |

(51) Int. Cl.
   *G10L 21/00* (2006.01)
   *G10L 15/22* (2006.01)
   *A63F 9/18* (2006.01)

(52) U.S. Cl. .................... 704/272; 704/270; 704/275; 463/1; 463/23

(58) Field of Classification Search ................. 704/251, 704/258, 270, 272, 275; 382/118; 463/1, 463/23
See application file for complete search history.

(56) References Cited

U.S. PATENT DOCUMENTS

| 3,145,993 A | * | 8/1964 | Archer ........................ 273/238 |
| 4,439,161 A | * | 3/1984 | Wiggins et al. ............. 434/201 |
| 4,652,998 A | * | 3/1987 | Koza et al. .................... 463/26 |
| 4,975,959 A | | 12/1990 | Benbassat |
| 5,239,617 A | | 8/1993 | Gardner et al. |
| 5,358,259 A | * | 10/1994 | Best ............................ 463/31 |
| 5,540,589 A | * | 7/1996 | Waters ....................... 434/156 |
| 5,797,116 A | | 8/1998 | Yamada et al. |
| 6,044,347 A | * | 3/2000 | Abella et al. ................ 704/272 |

(Continued)

FOREIGN PATENT DOCUMENTS

JP   A-UM-S59-167576   11/1984

(Continued)

OTHER PUBLICATIONS

Abe et al, "WebMessenger: A New Framework to Produce Multimedia Content by Combining Synthesized Speech and Moving Pictures in the WWW Environment," Proc. Of MMSP, 1999, pp. 611-616.*

(Continued)

*Primary Examiner*—James S Wozniak
(74) *Attorney, Agent, or Firm*—Posz Law Group, PLC

(57) ABSTRACT

The system for performing interactive dialog of the present invention recognizes a question from a user and outputs an answer by a synthesized voice. The system includes; a selection unit for selecting the answer from a database; an evaluation unit for evaluating a dialog between the user and computer and determining whether or not to continue the dialog. The evaluation unit may evaluate a dialog consistency, or dialog circumstance. Further, the selection unit selects and combines on the basis of the determination result the answer with one of a plurality of dialog sentences. The system may further comprises a learning unit for storing a novel answer unknown to the computer, by interrogating the user about the novel answer and further storing the interrogation scenario.

19 Claims, 12 Drawing Sheets

U.S. PATENT DOCUMENTS

| | | | |
|---|---|---|---|
| 6,173,266 B1 * | 1/2001 | Marx et al. | 704/270 |
| 6,213,873 B1 * | 4/2001 | Gasper et al. | 463/14 |
| 6,236,968 B1 * | 5/2001 | Kanevsky et al. | 704/275 |
| 6,449,591 B1 * | 9/2002 | Kondo et al. | 704/222 |
| 6,452,348 B1 * | 9/2002 | Toyoda | 318/3 |
| 6,510,411 B1 * | 1/2003 | Norton et al. | 704/254 |
| 6,556,970 B1 | 4/2003 | Sasaki et al. | |
| 6,708,081 B2 * | 3/2004 | Yoshida | 700/245 |
| 6,721,706 B1 * | 4/2004 | Strubbe et al. | 704/275 |
| 6,793,498 B1 * | 9/2004 | Nunes | 434/322 |
| 6,905,340 B2 * | 6/2005 | Stansvik | 434/322 |
| 7,013,275 B2 * | 3/2006 | Arnold et al. | 704/244 |
| 7,082,392 B1 * | 7/2006 | Butler et al. | 704/233 |
| 7,397,918 B2 * | 7/2008 | Patinkin et al. | 380/200 |
| 2004/0006483 A1 | 1/2004 | Sasaki et al. | |

FOREIGN PATENT DOCUMENTS

| | | | |
|---|---|---|---|
| JP | A-S62-147498 | | 7/1987 |
| JP | A-01-233619 | | 9/1989 |
| JP | B2-H01-052758 | | 11/1989 |
| JP | A-05-108084 | | 4/1993 |
| JP | A-06-223104 | | 8/1994 |
| JP | 06269534 A | * | 9/1994 |
| JP | A-H07-005891 | | 1/1995 |
| JP | A-10-074035 | | 3/1998 |
| JP | A-10-133683 | | 5/1998 |
| JP | 2000-61137 A | * | 2/2000 |
| JP | A-2000-061137 | | 2/2000 |
| JP | 2001190830 A | * | 7/2001 |
| JP | A-2001-179665 | | 7/2001 |
| JP | A-2001-190830 | | 7/2001 |
| JP | A-2001-242881 | | 9/2001 |
| JP | A-2001-282090 | | 10/2001 |
| JP | A-2001-286677 | | 10/2001 |
| JP | A-2001-331196 | | 11/2001 |
| JP | 2001-357053 | | 12/2001 |
| JP | A-2002-023614 | | 1/2002 |
| JP | A-2002-162986 | | 6/2002 |
| JP | A-2002-248263 | | 9/2002 |
| JP | A-2004-037910 | | 2/2004 |
| WO | WO 0191466 A2 | * | 11/2001 |

OTHER PUBLICATIONS

USPTO translation of JP 06-269534, originally published Sep. 27, 2004, from Feb. 2007.*
IBMC, "Word-chain game system," NNRD 452123, IBM technical Disclosure Bulletin, Dec. 10, 2001.*
PTO Translation of JP2000-61137, Jul. 2008, pp. 1-43.*
PTO Translation of JP2001-190830, Jul. 2008, pp. 1-68.*
Notification of Reasons for Rejection from Japanese Patent Office issued on May 30, 2006 for the corresponding Japanese patent application No. 2002-195904 (a copy and English translation thereof).
Notification of Reasons For Rejection from Japanese Patent Office issued on Jul. 4, 2006 for the corresponding Japanese patent application No. 2002-219764 (a copy and English translation thereof).
Decision of Refusal from Japanese Patent Office issued on Oct. 3, 2006 for the corresponding Japanese patent application No. 2002-195904 (a copy and English translation thereof).
Decision of Refusal from Japanese Patent Office issued on Dec. 19, 2006 for the corresponding Japanese patent application No. 2002-219764 (a copy and English translation thereof).
Notification of Reasons for Rejection from Japanese Patent Office issued on Jan. 9, 2007 for the corresponding Japanese patent application No. 2002-269941 (a copy and English translation thereof).

* cited by examiner

FIG. 5

| SYSTEM 1 | USER 1 | SYSTEM'S RECOGNITION | SYSTEM'S DETERMINATION | SYSTEM 2 | SYSTEM'S DETERMINATION | USER'S IMPRESSION | RESULT | CASE |
|---|---|---|---|---|---|---|---|---|
| APPLE | EAT | EAT | CORRECT | TIMPANI | CORRECT | CORRECT | UNDECIDED | 1a |
| APPLE | EAT | EEL | CORRECT | LAMP | CORRECT | QUEER BUT O.K. | UNDECIDED | 1b |
| APPLE | EAT | EEL | CORRECT | LAMP | CORRECT | QUEER. I WON. | SYSTEM'S DEFEAT | 1c |
| APPLE | EAT | EEL (SECOND) | WRONG | I WON. | I WON. | I AM CORRECT | UNDECIDED | 1d |
| APPLE | EAT | BEAT | QUEER, BUT O.K. | TIMPANI | CORRECT | CORRECT | UNDECIDED | 1e |
| APPLE | EAT | BEAT | WRONG | I WON. | I WON. | I AM CORRECT | UNDECIDED | 1f |
| APPLE | EAT | BEAT | QUEER BUT INTENTIONAL DEFEAT | TIGER | I WAS DEFEATED | I WON. | SYSTEM'S DEFEAT | 1g |
| APPLE | EAT (SECOND) | EAT (SECOND) | WRONG | I WON. | I WON. | I WAS DEFEATED | SYSTEM'S VICTORY | 2a |
| APPLE | EAT (SECOND) | EEL | CORRECT | LAMP | CORRECT | QUEER BUT O.K. | UNDECIDED | 2b |
| APPLE | EAT (SECOND) | EEL | CORRECT | LAMP | CORRECT | QUEER. I WON. | SYSTEM'S DEFEAT | 2c |
| APPLE | EAT (SECOND) | EEL | INTENTIONAL DEFEAT | MARION | I WAS DEFEATED | I WON. | SYSTEM'S DEFEAT | 2d |
| APPLE | EAT (SECOND) | EEL (SECOND) | WRONG | I WON. | I WON. | I WAS DEFEATED | SYSTEM'S VICTORY | 2e |
| APPLE | EAT (SECOND) | EEL (SECOND) | WRONG | I WON. | I WON. | I AM CORRECT | UNDECIDED | 2f |
| APPLE | EAT (SECOND) | BEAT | QUEER BUT O.K. | TIMPANI | CORRECT | I AM CORRECT | UNDECIDED | 2g |
| APPLE | EAT (SECOND) | BEAT | WRONG | I WON. | I WON. | I WON. | SYSTEM'S DEFEAT | 2h |
| APPLE | EAT (SECOND) | BEAT | QUEER BUT INTENTIONAL DEFEAT | TIGER | I WAS DEFEATED | I WON. | SYSTEM'S DEFEAT | 2i |
| APPLE | LEAD | LEAD | QUEER BUT O.K. | DREAM | CORRECT | CORRECT | UNDECIDED | 3a |
| APPLE | LEAD | LEAD | WRONG | I WON. | I WON. | I WAS DEFEATED | SYSTEM'S VICTORY | 3b |
| APPLE | LEAD | LEAD | INTENTIONAL DEFEAT | MARION | I WAS DEFEATED | CORRECT | SYSTEM'S DEFEAT | 3c |
| APPLE | LEAD | EAT | CORRECT | TIMPANI | CORRECT | QUEER BUT O.K. | UNDECIDED | 3d |
| APPLE | LEAD | EAT | CORRECT | TIMPANI | CORRECT | QUEER. I WON. | SYSTEM'S DEFEAT | 3e |
| APPLE | LEAD | MEAT | QUEER BUT O.K. | TRUMP | CORRECT | QUEER | UNDECIDED | 3f |
| APPLE | LEAD | MEAT | WRONG | I WON. | I WON. | I WAS DEFEATED | SYSTEM'S VICTORY | 3g |
| APPLE | LEAD | MEAT | INTENTIONAL DEFEAT | MARION | I WAS DEFEATED | CORRECT | SYSTEM'S DEFEAT | 3h |
| APPLE | EHET | EAT | CORRECT | TIMPANI | CORRECT | QUEER | UNDECIDED | 4a |
| APPLE | EHET | EATON | CORRECT | NECTAR | CORRECT | WRONG | UNDECIDED | 4b |
| APPLE | EHET | EAT (SECOND) | WRONG | I WON. | I WON. | I AM CORRECT | UNDECIDED | 4c |
| APPLE | EHET | BEAN | QUEER BUT O.K. | NECTAR | CORRECT | CORRECT | UNDECIDED | 4d |
| APPLE | EHET | BEAN | WRONG | I WON. | I WON. | I AM CORRECT | UNDECIDED | 4e |
| APPLE | EHET | BEAN | INTENTIONAL DEFEAT | NETWORK | I WAS DEFEATED | WRONG | SYSTEM'S DEFEAT | 4f |

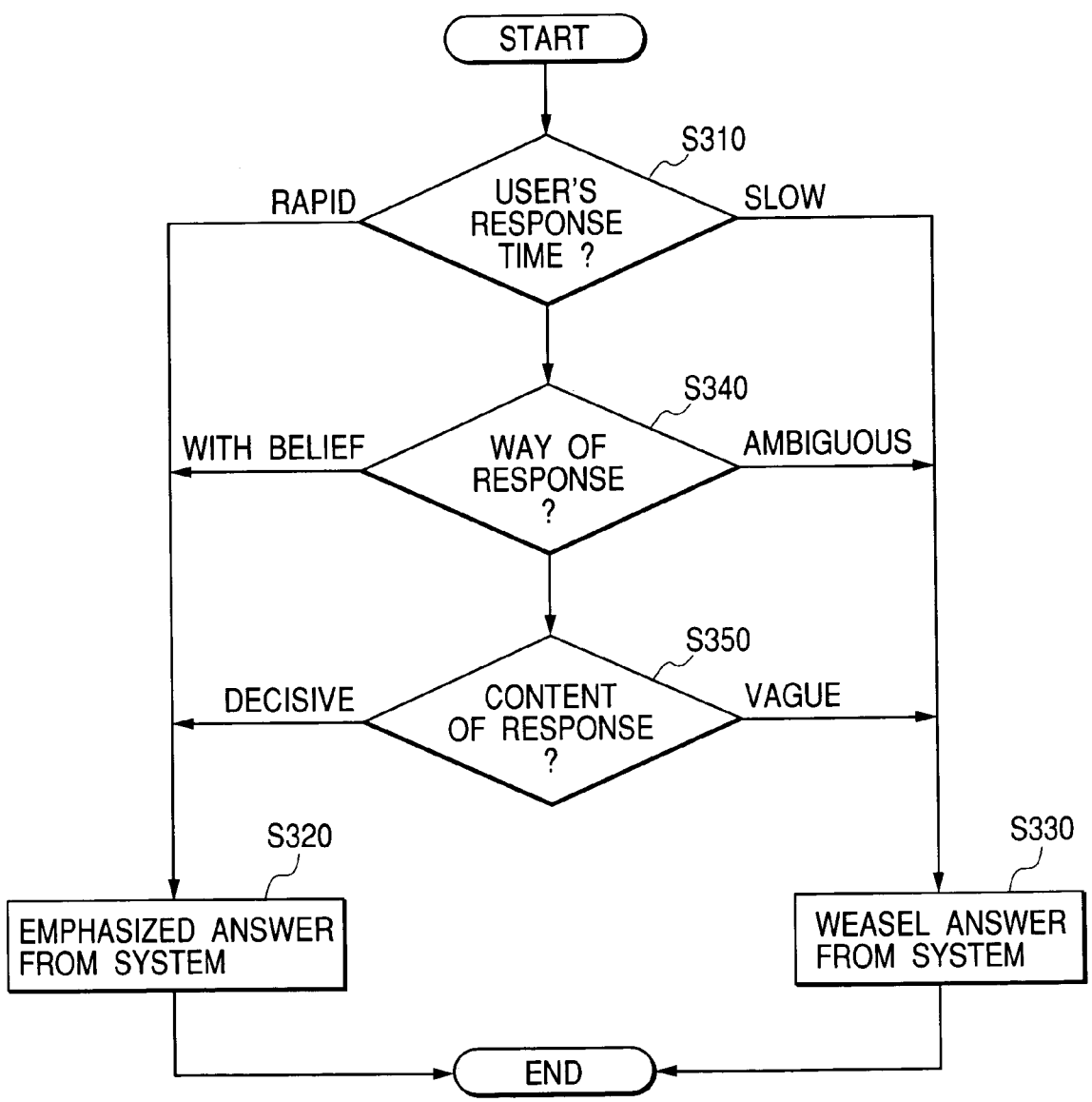

SYSTEM FOR PERFORMING INTERACTIVE DIALOG

BACKGROUND OF THE INVENTION

1. Field of the Invention

The present invention relates to a computer interactive system through a voice or non-voice dialog and more particularly to, for example, a word chain game system utilizing speech recognition, wherein a user and computer dialogue with each other through speech recognition and synthesizing on the computer side which evaluates a consistency of the dialog, judges a circumstance of the dialog, determines whether or not to continue the dialog, and learning from the user an answer of which answer is not yet known to the system.

2. Description of the Related Art

There is disclosed, for example, in JP2001-357053A, a computer system for performing interactive dialog, wherein information is exchanged between a user and system, for example, a car navigation system for interrogating a destination, e.g., a restaurant to which the user are going, or an amusement system, e.g., a word chain game system.

However, conventional systems for performing interactive dialog have following three disadvantages.

Disadvantage 1 is that the user soon gets tired of a monotonous dialog regardless of a voice dialog or non-voice dialog with the computer system, because the computer system executes exactly the same dialog as far as the user correctly inputs necessary information, while the system is provided with a lot of vocabularies. Further, the dialog is often interrupted, due to incorrect recognition on either side, thereby damaging a joy of the dialog. Particularly, the conventional word chain system or apparatus has a disadvantage that the system is apt to win always and hurts the user's feeling, because the system or apparatus stores in its memory a lot of vocabularies. Further, the conventional word chain system or apparatus has another disadvantage that the game is often interrupted, due to incorrect recognition on either side, thereby damaging a joy of the word chain.

Disadvantage 2 is that the user soon gets tires of the word chain game, if the system merely outputs only a single word answer. Particularly, the user becomes bored by a tedious progress of the word chain, if the dialog is not devised at all. In other, words, the dialog is not sufficiently diversified, depending upon a prescribed situations and conditions.

Disadvantage 3 is that the system can not respond at all to the user's question of which answer is not yet known by the system, thereby interrupting the game. If the game should not be interrupted, the topic is necessarily changed. Thus, the conventional dialog such as a conventional word chain game is not fully intellectual. Further, uninterestingly, the system merely outputs a completely fixed answer.

SUMMARY OF THE INVENTION

Object 1 of the present invention in order to overcome Disadvantage 1, is to provide a system for performing interactive dialog such as a word chain game system which can continue a dialog or word chain without hurting a user's feeling, even when incorrect recognition is caused by either side. Therefore, Object 1 of the present invention is to joyfully complete the dialog through voice input or non-voice input, or more particularly word chain through voice input and output.

Object 2 of the present invention, in order to overcome Disadvantage 2, is to provide a system for performing interactive dialog, e.g., a word chain system which can select a suitable response pattern corresponding to the game circumstances, thereby preventing the user from feeling tiresomeness and displeasure.

Object 3 of the present invention, in order to overcome Disadvantage 3, is to provide a system for performing interactive dialog, e.g., which can execute an intellectual and natural dialog in such a manner that the voice output is adaptively changed depending upon the dialog situations, thereby satisfying user's curiosity and intelligence.

In the system for performing interactive dialog of the present invention, a computer recognizes a question from a user and outputs an answer to the user.

Therefore, in general, the system for performing interactive dialog of the present invention comprises: a recognition unit for recognizing the question; a selection unit for selecting the answer; an evaluation unit for evaluating a dialog between the user and system under a prescribed criterion and determining whether or not to continue the dialog; and an output unit for outputting the answer or a statement for continuing or ending the dialog.

Further, the evaluation unit may evaluate a consistency of the dialog; and the output unit outputs the answer and/or a system's response.

Here, the dialog may be executed by voice input or non-voice input (such as key board input or touch panel input or other possible inputs) and by voice output or non-voice output (such as display or print-out).

Further, the computer program for operating the above mentioned system for performing interactive dialog comprises subroutines of: a recognition subroutine for recognizing the question; a selection subroutine for selecting the answer; an evaluation subroutine for evaluating a consistency of a dialog between the user and system under a prescribed criterion and for determining whether or not to continue the dialog; and an output subroutine for outputting the answer or a statement for continuing or ending the dialog.

If the dialog input is the voice input, the system for performing the interactive dialog of the present invention is a system for performing interactive dialog.

The above mentioned system for performing interactive dialog, in general, comprises: a speech recognition unit for recognizing the question; a selection unit for selecting the answer; an evaluation unit for evaluating a dialog between the user and system under a prescribed criterion and determining whether or not to continue the dialog; and a voice synthesizing unit for outputting the answer or a statement for continuing or ending the dialog.

More specifically, the above mentioned system for performing interactive dialog of the present invention includes three Features as stated below.

In Feature 1, in order to achieve Object 1, the above-mentioned evaluation unit may evaluate a consistency of the dialog.

According to Feature 1, the dialog is continued, when the user's non-voice input or voice input is recognized correctly and the dialog is consistent. On the other hand, even when the dialog is of cross-purposes, contradictory, erroneous or inconsistent, the user's speech content is not always denied. Rather, the dialog may be continued, if it is determined to be better to continue, on the basis of the evaluation result under a prescribed condition, without being limited merely to the correctness or error in the speech or answer of the user or computer. The system selects a suitable answer and speech among prescribed options, in order to continue the dialog. Thus, even when the user pronounced the word incorrectly or erroneously, the dialog is not always stopped in vain, but is continued under a prescribed condition, thereby finally completing the dialog at a preferable timing.

In Feature 2, in order to achieve Object 2, the evaluation unit evaluates a circumstance of said dialog; the selection unit selects and combines on the basis of the determination result said answer with one of a plurality of dialog sentences; and the voice synthesize unit outputs the combined sentence. Here, the dialog circumstance means, for example, that a long time has passed from the beginning of the dialog such as word chain; the word chain has been executed a lot of times; the user spent much more time in the response; the user does not respond; the user is being successively defeated; or the user appears to give offense to the system, judging from the user's way if speaking. There are stored in the system one or more prescribed dialog sentences for dialog circumstances.

According to Feature 2, it is prevented that the user feels tiresomeness and displeasure, because the system outputs in accordance with the dialog circumstance one of the suitable prescribed dialog sentences, thereby causing an interest in the user.

In Feature 3, in order to achieve Object 3, the system for performing interactive dialog comprises a learning unit for storing a novel answer unknown to the system, by interrogating the user about the novel answer by using a synthesizing unit and storing the novel answer and a scenario regarding the interrogation.

According to Feature 3, when an unanswerable question was given to the system, the system responds at the spot that it does not know the answer. However, next time when the similar question is given, the system can answer that question, because it has already learned the scenario and the novel answer which was once unanswerable. As a result, the dialog becomes more intellectual and the system can offer a new topic and information to various users.

BRIEF EXPLANATION OF THE DRAWINGS

FIG. 5 is a table showing condition branches and strategies in a word chain game.

FIG. 12 is a flow chart of the operation in accordance with the intelligent function off the system for performing interactive dialog of Embodiment 3.

PREFERRED EXAMPLE OF THE INVENTION

Figure 1:
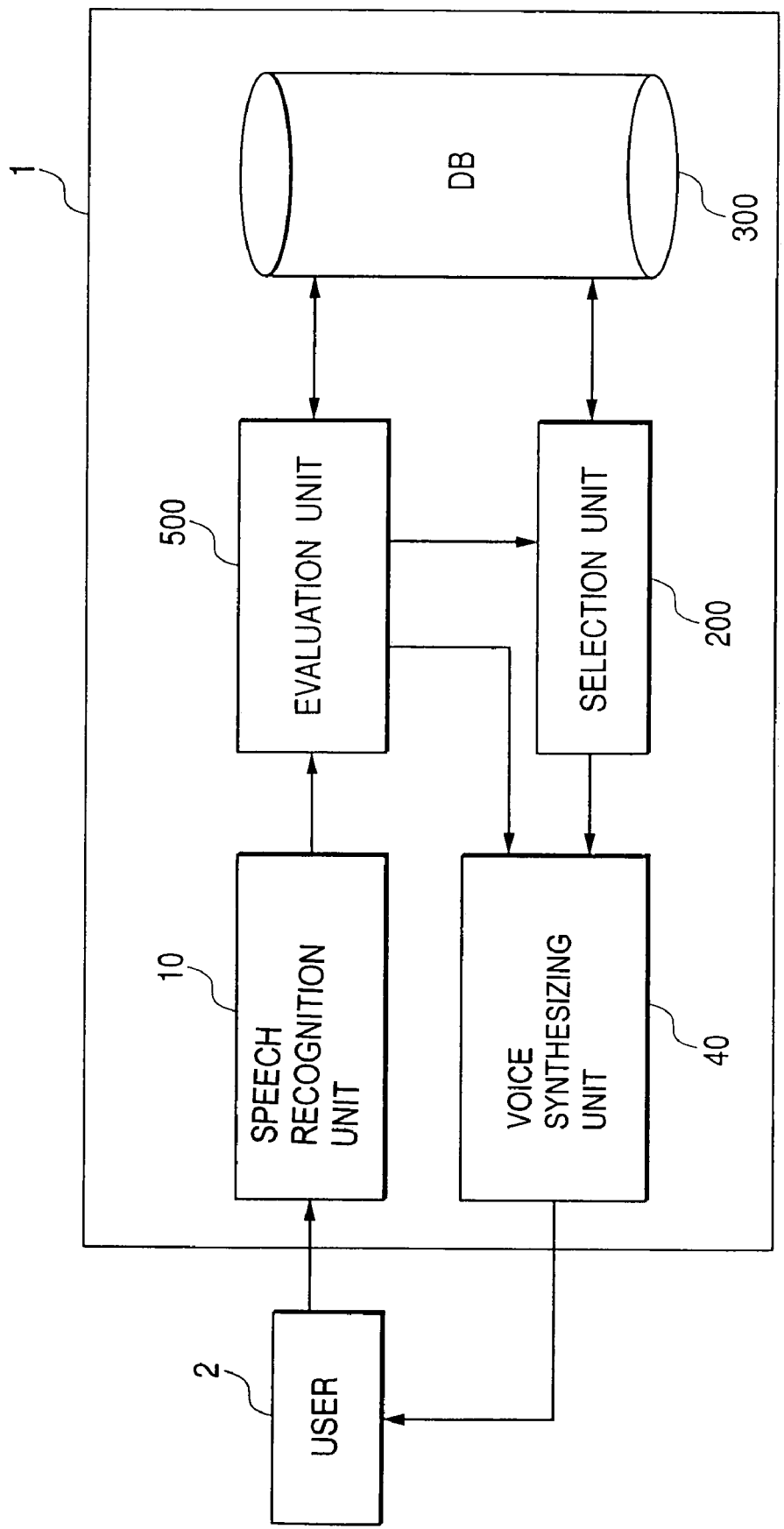
FIG. 1 is a block diagram of the fundamental structure of the system for performing interactive dialog of the present invention.

Fundamental structure and preferred embodiments of the present invention are explained concerning a voice interactive dialog system, referring to the drawings.

However, it should be understood that the dialog is not limited to a voice dialog, but is also applied to any kind of dialog between a user and computer.

FIG. 1 is a block diagram of the fundamental system for performing interactive dialog of the present invention.

As shown in FIG. 1, the voice interactive computer system comprises: a speech recognition unit 10 for recognizing said question; a selection unit 200 for selecting said answer; an evaluation unit 500 for evaluating a dialog between said user 2 and said computer system 1 under a prescribed criterion and determining whether or not to continue said dialog; and a voice synthesizing unit 40 for outputting said answer or a statement for continuing or ending said dialog.

The computer system further comprises a database 300 accessed by the evaluation unit 500 and the selection unit 200 for searching the answers, dialog sentences and interrogation scenarios.

Embodiment 1

Embodiment 1 corresponds to Feature 1 as stated in the summary of the invention which can continue such a dialog as a word chain without hurting a user's feeling, even when there is caused incorrect recognition on the system side or user side, thereby joyfully completing the dialog.

Figure 2:
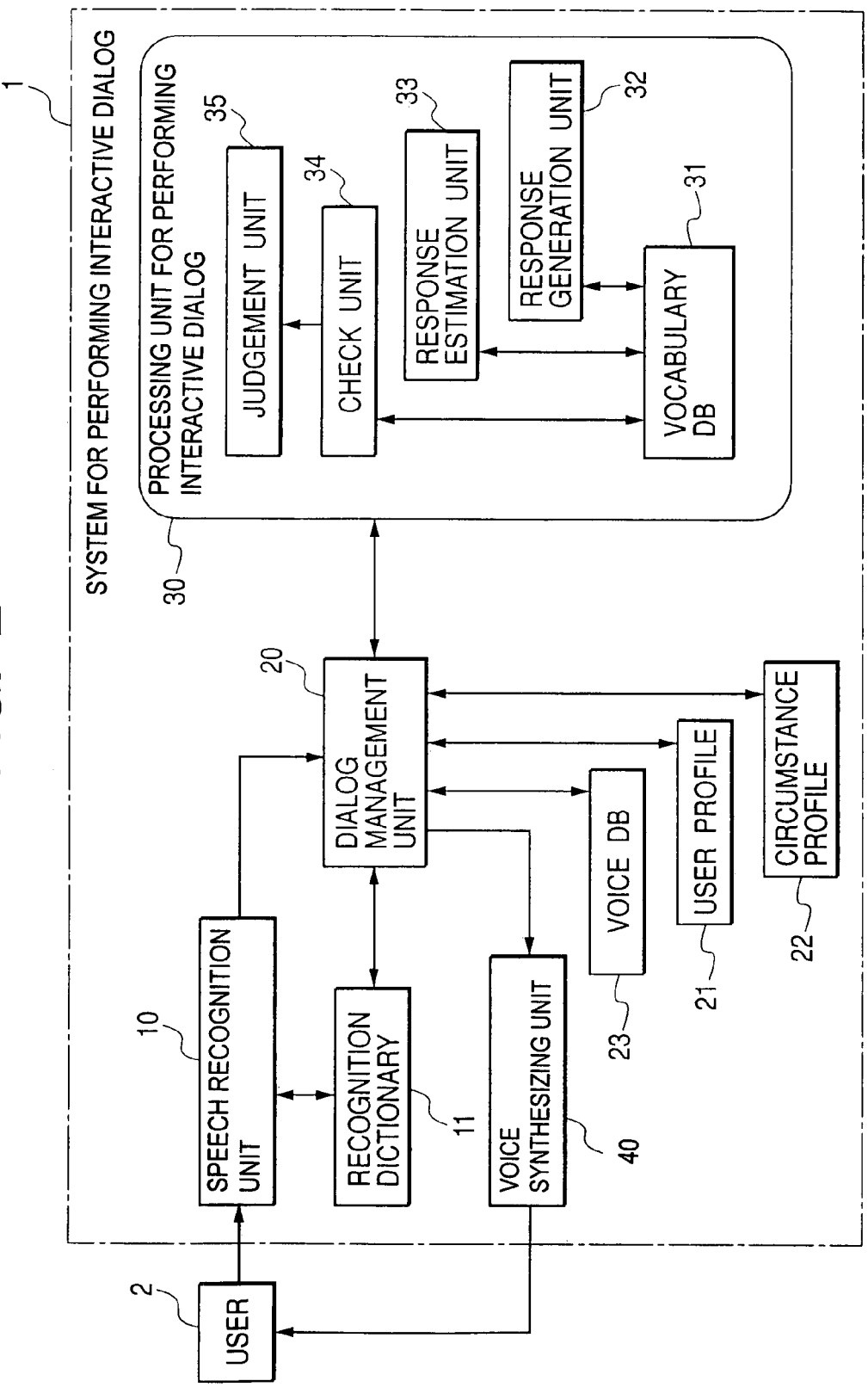
FIG. 2 is a block diagram of the system for performing interactive dialog of Embodiment 1 of the present invention which can continue such a dialog as a word chain without hurting a user's feeling, even when there are caused an incorrect recognition on the system side and user side, thereby joyfully completing the dialog.

FIG. 2 is a block diagram of the voice interactive computer system (e.g., a word chain game) system of Embodiment 1 which comprises: a speech recognition unit 10; a recognition dictionary 11; a dialog management unit 20; a word chain processing unit 30; and a voice synthesizing unit 40.

Here, the dialog management unit 20 corresponds to the selection unit 200, while the word chain processing unit 30 corresponds to the evaluation unit 500.

The user's voice is inputted through a not-shown microphone into the speech recognition unit 10 which recognizes the voice, referring to a recognition dictionary 11, and outputs the recognition result to the dialog management unit 20. The dialog management unit 20 manages the progress of the dialog, referring to the word chain processing unit 30, a user profile 21, a circumstance profile 22 and a voice database 23, generates a response to the user and outputs the response.

The user profile 21 is a database for storing the user's attributes such as a gender, age, taste, character, vocation and status. The circumstance profile 22 is a database for storing a circumstance where and how the system 1 is used. The voice database 23 is a database for storing kinds of voices corresponding to the user's attributes stored in the user profile 21. For example, a polite expression is employed for a user with a socially high status, while a friendly word is selected for youth and children.

The word chain management unit 30 comprises: a vocabulary database 31; a word chain response generation unit 32; a verse capping response estimation unit 33; a word chain check unit 34; and an overall judgement unit 35.

Figure 3:
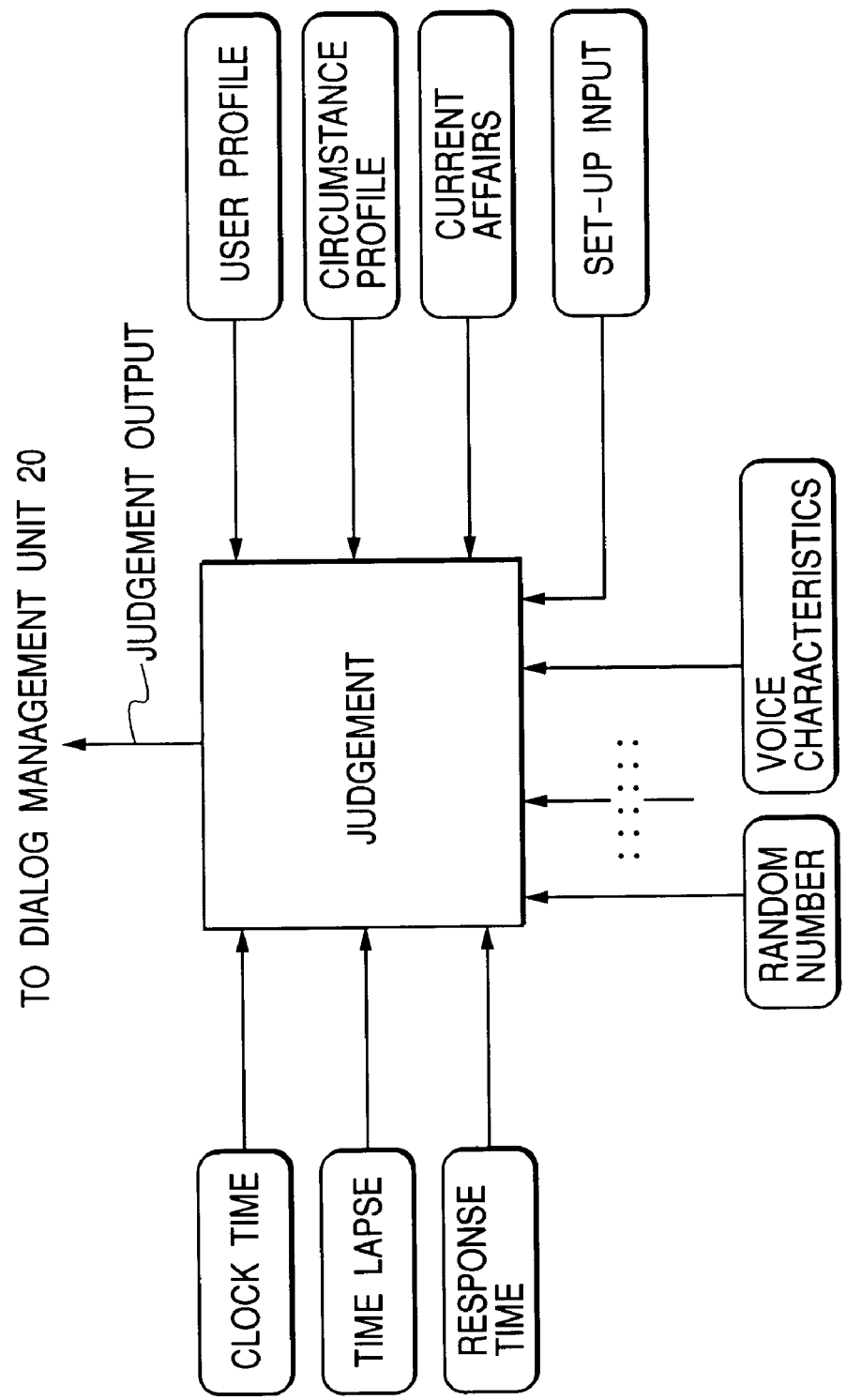
FIG. 3 shows a function of the judgement unit as shown in FIG. 2.

FIG. 3 shows a function of the dialog management unit 20 for managing the present clock time, the time lapse from the game start and a time spent for each response; executes, on the basis of contents of the user profile, circumstance profile, current events & affairs and set-up input, a suitable strategic evaluation for the present voice of the user. A management result is outputted to the voice synthesizing unit 40.

Here, the set-up input is inputted by the user or third party before starting the word chain game. The set-up inputs for raising amusingness of the game are such set-ups whether or not to insert an intentional error, to select a user's favorite word, to select a word which the user dislikes and to select a word which is easily answered.

Further, the characteristics of the user's pronunciation may be recorded for a robustness of the speech recognition as explained later. Further, if a plurality of suitable evaluation results are found, one of them may be selected by using a random number.

Then, the voice synthesizing unit 40 converts the response generated by the dialog management unit 20 into synthesized voices.

Figure 4:
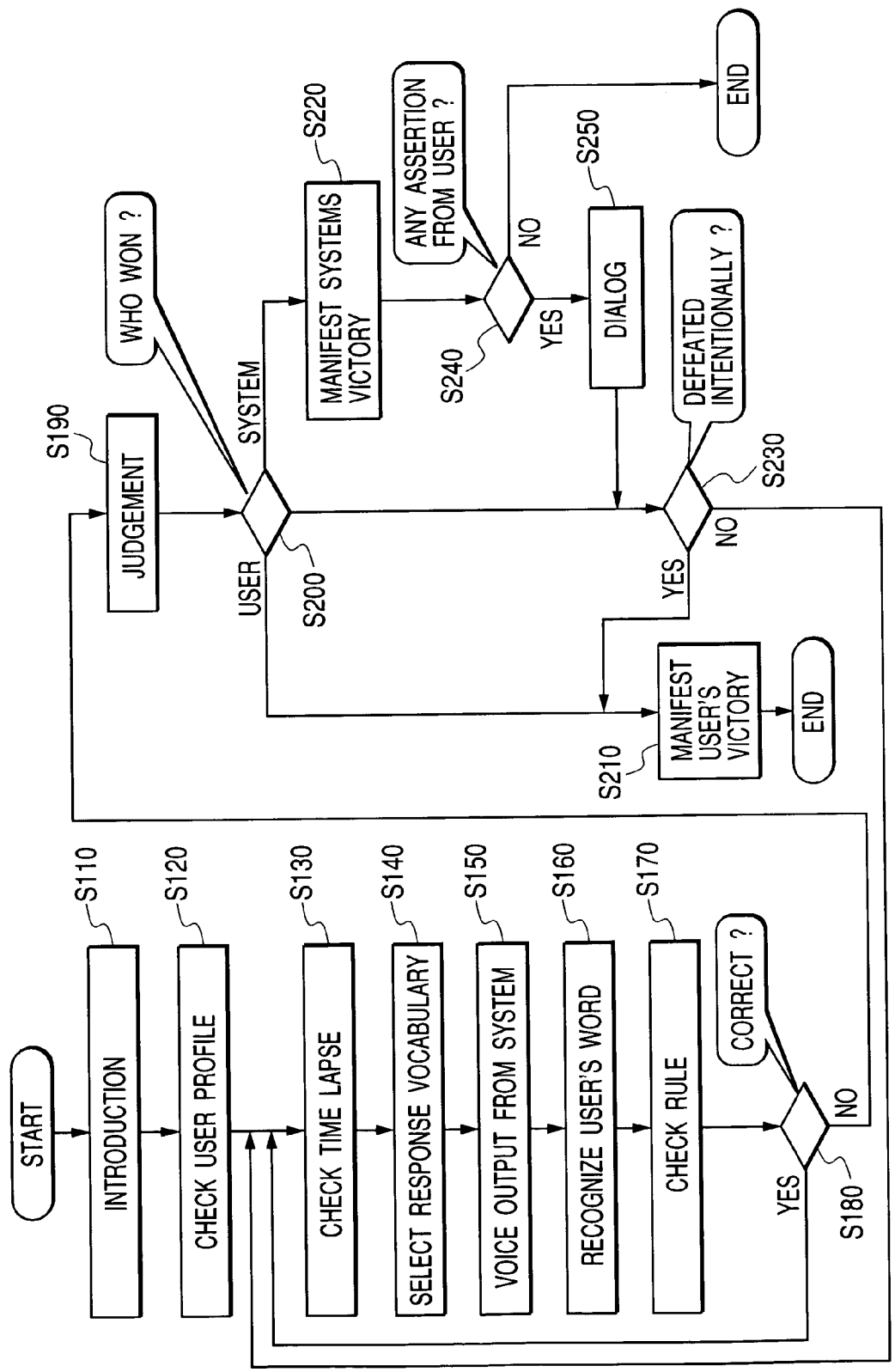
FIG. 4 is a flow chart for the operation of the system for performing interactive dialog of Embodiment 1 of the present invention.

FIG. 4 is a flow chart for the operation in the system for performing interactive dialog of the present invention.

First, an introductory dialog is executed between the system 1 and the user 2 at S110. The introductory talk from the system 1 may be, for example, "Hello.", "Let's start chaining words.", "Give me your name.", "Where are you from?", "How old are you?", "What is your work?" or the like. Then, the user 2 replies to the system 1. Then, the system 1: recognizes the user's introductory talk; refers to user profile 21 and circumstance profile 22 at S120; certifies the user; determines the attributes; selects the kind of voice; and sets up a genre and difficulty of the word chain.

Then, the time lapse is checked at S130, and a vocabulary is selected from the vocabulary database 31 at S130 and outputs the voice at S150. The first word from the system may be a relatively easy one against which the user 2 smoothly think out the answer.

Then, the user 2 pronounces the answer verse. Then, the system 1 recognizes the answer verse at S160 and evaluates whether or not the user's answer is in conformity with the game rules at S170.

If it is correct at S180 (YES), S130 follows, the time lapse is checked and a next vocabulary is generated at S140. Thus, the game is continued. On the other hand, if it is wrong at S180 (NO), the overall decision is made on the basis of an error classification as explained later in the interactive dialog, the time lapse, user profile, a time zone and the circumstance profile.

For example, the system 1 may intentionally manifest its defeat, when the user is of great importance. Further, the system 1 may strictly decide the victory or defeat, when the user is a child who is apt to become absorbed in the game. Further, the game may be continued depending upon the user's assertion and rebut. Further, the end of the game is manifested, when a prescribed time has lapsed.

If the system 1 decided the user's victory on the basis of the above-mentioned overall decision at S200, the system outputs a synthesized voice manifesting the user's victory at S210.

On the other hand, if the system 1 won at S200, the system 1 outputs a synthesized voice manifesting the system's victory at S220. At the same time, the system confirms whether or not the user rebuts. If there is no rebut at S240 (NO), the game is finished. On the other hand, if there is a rebuttal from the user at S240 (YES), the system 1 dialogues with the user 2.

If the game result can not be decided at S200, or if the dialog about the rebuttal was executed, it is decided whether or not the system intentionally and strategically defeat itself. Then, if the system decided affirmatively at S230 (YES), the system 1 manifests the user's victory, thereby completing the game. On the other hand, the system decided negatively at 230 (NO), S130 follows, thereby continuing the game.

Here, an error classification in the interactive dialog is explained.

Two possible errors may be caused on the user side. One type of the error is a hearing miss, and the other type of the error is a wrong answer.

Further, on the computer side, there are also two types of error. One is caused by the speech recognition unit 10, when the evaluation of the game circumstance is right, although the speech recognition unit 10 did not correctly recognizes the user's word. The other is caused, when the speech recognition unit 10 correctly recognizes the user's voice, although the evaluation of the game circumstance is wrong.

In general, it is not hardly suspected that the system erroneously decides on the logic and rule of the word chain or on the task conditions, as far as there is not any bugs in the software and hardware. Accordingly, it usually happens that the incorrect recognition by the speech recognition unit 10 may be caused, and as a result the system 1 looks like executing a wrong evaluation. However, it may happen that one of the prescribed strategies is selected among a several options in accordance with the game circumstance, user profile or probability calculation.

For example, when the user submitted a wrong word against the word chain rule, there may be such strategies as allowing the user's mistake, not allowing the mistake, the system intentionally defeated, or questioning back. Although the selection should be executed on the basis of the time lapse, user profile, the time zone and game circumstance, the selection result may not always be suitable and agreeable for the user. For example, it may be difficult to select a suitable option, if the system 1 of the present invention is mounted on an automotive vehicle, and the traffic is jammed.

In order to optimize the response adaptive to the user 1, it may be preferable for the system 1 to defeat itself intentionally, when: the time lapse is too long; speech recognition does not work; the dialog becomes stiff; and the like.

Further, it may be preferable for the system 1 to allow the user's correction for quickly interrupting and restate the word.

Further, it may be preferable for the system 1 to allow the user's mistake, when the user really said a wrong word, concretely when, e.g., a designated genre was neglected; chained word could not form the word chain; or a monolog during thinking was recognized, or when the system 1 found out the user's mistake on the basis of the analysis.

Further, it may be preferable for the system 1 to delicately change the response pattern. For example, the system 1 may say "Hold out." as well as "I win.", when the system 1 won or the user 2 was embarrassed. Further, the system 1 may change the way of speech such as "I was defeated, wasn't I." or "Alas, I have lost," thereby giving a natural feeling. If the system 1 was defeated, it may be more preferable to choose from among a group of responses, such as "I was defeated.", "You are strong.", "You won.", "Any more word.", "No time.", and "Gave up." and the like. Further, it may be preferable for the system 1 to give the user a hint, when: the user is embarrassed; a waiting time has passed over a prescribed time period; "er", "well", or "let me see" and the like was pronounced; or the user made wrong answers a plurality of times. The hint may be such that "Names of fishes or birds may be all right.", "Remember a bird beginning with "M".

The hint giving function is related with a set-up of the difficulty degree, response estimation function and database used for generating a response.

It is effective to give robustness to the speech recognition in order to recognize various accent, tone and speaking speed.

It is also effective to exclude monologues of the user 2 from the speech recognition by storing possible monologues in the recognition dictionary 11 and deleting them, if found any in the pronunciation of the user 2.

It is also effective to set up a time interval for detecting a silence, depending upon the dialog. In general, a speech start switch is employed for excluding noises and surplus voices. However, if the speech recognition is executed without the speech start switch, a silence time period is often detected, thereby recognizing a gap between sentences. Here, if the silence detecting time period is prescribed too short, the sentence gap can not detected. Therefore, the silence detecting time should be set up suitably short.

The system 1 may further be provided with other functions regarding a hysteresis, difficulty degree, response estimation, key word forecast and intentional error, as explained below.

The hysteresis is to display, pronounce, or output, (by using a suitable output means such as a liquid crystal display (LCD), speaker, or printer), a series of the words spoken at each dialog by the system 1 and user 2 in a progress of the dialog.

The difficulty degree is set up in terms: of a limitation of the response time (e.g., within 10 sec, within 30 sec, within 1 minute, unlimited); of a vocabulary limitation by genres; of hint giving; and of the system's intentional defeat. Those conditions are set up in accordance with the user's attributes.

The response database stores a plurality of exemplary verse sequences which are easily capped.

The response forecast is to estimate the response by analyzing such a network structures of vocabulary that a estimation word set P(x) is determined by a given ending "x" of a word. Several strategies are constructed by using the estimation word set P(x). One of the strategies is to give a hint. Another strategy is to avoid the ending "x" on the basis of a determination that a certain word is difficult to hit upon, when the certain word has not been pronounced yet in the present progress of dialog and moreover a number N of the certain word $\epsilon P(x)$ is smaller than or equal to a prescribed threshold. On the contrary, when the degree of difficulty is set up high, the above mentioned certain word $\epsilon P(x)$ may be selected in the dialog.

Further, the response forecast may be employed in combination with the user profile in such a manner that the system 1 and user 2: does not say the words which the user 2 dislikes; or say the words which the user 2 likes. On the contrary, in order to stress the user 2, the system 1 and/or user 2 may say the words which the user 2 dislikes.

The key word forecast is to specify a group of related and associated key words & key phrases. For example, the word "apple" is related and associated to orange, fruit, food, red, sour and my favorite thing and so on. Enlarged sets of the related and associated key words & phrases can be utilized also in an association game and can develop topics of the dialog, wherein a specific key word or phrase is selected or excluded as in the word chain game.

The intentional error is to pretend to mishear and misunderstand a pronounced word and to ask back, thereby adding amusingness to the dialog.

The intentional error may be introduced by a mis-transformation of, e.g., a Japanese character from a chinese character in text input as well as mishearing in the voice input may be introduced.

FIG. 5 is a table showing an example of branches and strategies of the system 1 in a word chain game.

Here, it is assumed that the user 2 is defeated, if he or she said the same word twice and that the system 1 never do that.

In Branch 1 as shown in FIG. 5, the system 1 first says "apple" against which the user 2 correctly says "eat".

In Case 1a in Branch 1, the system correctly recognizes "eat" and determines that the word chain meets the rule, whereby the system 1 says "timpani". The user's impression is that the system's answer is all right. Therefore, the dialog result is undecided and the game is continued.

In Case 1b in Branch 1, the system 1 erroneously recognizes "eat" as "eel", but determines the word chain meets the rule, whereby the system 1 says "lamp". The user's impression is that the system's answer is queer. However, the dialog result is undecided and the game is continued.

In Case 1c in Branch 1, the system 1 erroneously recognizes "eat" as "eel", and determines that "eel" is a correct verse capping and says "lamp. Therefore, the user 2 gets a queer impression and manifests his or her victory. The system 1 accepts the user's manifest, thereby ending the game.

In Case 1d in Branch 1, the system 1 erroneously recognizes "eat" as "eel", but determines the word chain meets the rule. However, the "eel" was pronounced twice from the beginning of the game, thereby manifesting the system's victory. If the user 2 is not persuaded, the game result becomes undecided and the system 2 determines whether or not the system 2 is defeated intentionally.

In Case 1e in Branch 1, the system 1 erroneously recognizes "eat" as "beat", and moreover determines the word chain does not meet the rule. However, the system 1 allows the mistake of the user (actually the user is correct) in order to continue the game and then says "timpani". Thus, the game result becomes undecided and the game is continued.

In Case 1f in Branch 1, the system 1 erroneously recognizes "eat" as "beat", and moreover determines the word chain does not meet the rule. Therefore, the system 1 manifests its victory. The user 2 can protests against the system's victory. If the user 2 does not protest against the system's manifest of victory, the user's defeat becomes decided.

In Case 1g in Branch 1, the system 1 erroneously recognizes "eat" as "beat", and moreover determines the word chain does not meet the rule. However, the system 1 manifests its defeat by intentionally selecting from a prohibited genre a wrong word "tiger.

In Branch 2 as shown in FIG. 5, the system 1 first says "apple" against which the user 2 says second "eat" counted from the beginning of the game.

In Case 2a in Branch 2, the system correctly recognizes "eat" and manifests its victory, because of the second "eat".

In Case 2b in Branch 2, the system 1 erroneously recognizes "eat" as "eel" and says "lamp". The user 2 thinks that the system's answer is queer but admits it, thereby continuing the game.

In Case 2c in Branch 2, the system 1 erroneously recognizes "eat" as "eel" and says "lamp". The user 2 notices the system's mistake and manifests his or her victory. The system 1 accepts the user's manifest, thereby ending the game.

In Case 2d in Branch 2, the system 1 erroneously recognizes "eat" as "eel", and manifests its defeat by intentionally selecting "marion" from a prohibited genre. The user 2 is satisfied by noticing that the "eel" outputted from the system 1 does not meet the rule.

In Case 2e in Branch 2, the system 1 erroneously recognizes the second "eat" as "eel", and manifests its victory. The user 2 is persuaded, noticing that he or she said the second "eel".

In Case 2f in Branch 2, the system 1 erroneously recognizes the second "eat" as "eel", and manifests its victory. On the other hand, the user 2 protest, because he or she believes that he or she said a right word "eat" which meets the rule. Although the game becomes undecided, the system 1 decides the game strategically, if necessary.

In Case 2g in Branch 2, the system 1 erroneously recognizes "eat" as "beat", and moreover determines the word chain does not meet the rule. However, the system 1 allows the mistake of the user (actually the user is correct) in order to continue the game and then says "timpani". Thus, the game result becomes undecided and the game is continued.

In Case 2h in Branch 2, the system 1 erroneously recognizes "eat" as "beat", and moreover determines the word chain does not meet the rule. Therefore, the system 1 manifests its victory. On the other hand, the user 2 protests the system's manifest, without noticing that he or she said the second "eat". Then, if the system 1 notices that the user did not say "beat", but said "eat", the system 1 can persuade the user 2 that the "eat" is the second "eat". Even if the user 2 is not persuaded, the user 2 can continue the game, determining that he or she is not being defeated at least.

In Case 2i in Branch 2, the system 1 erroneously recognizes "eat" as "beat", and moreover notices the word chain does not meet the rule. However, the system 1 strategically and intentionally selects its defeat by saying a wrong word "tiger" from a prohibited genre.

In Branch 3 as shown in FIG. 5, the system 1 first says "apple" against which the user 2 says a wrong word "lead".

In Case 3a in Branch 3, the system 1 correctly recognizes "lead" and determines that the "lead" is wrong. However, the system 1 strategically allows the mistake and continues the game by saying a correct word "dream".

In Case 3b in Branch 3, the system 1 correctly recognizes "lead" and notices that the "lead" is wrong. Therefore, the system 1 manifests its victory.

In Case 3c in Branch 3, the system correctly recognizes "lead" and notices that the "lead" is wrong. However, the strategically selects its defeat, by saying a wrong word "dream" from a prohibited genre.

In Case 3d in Branch 3, the system 1 erroneously recognizes "lead" as "eat", and moreover determines that the "eat" is correct, whereby the system 1 says a correct answer "timpani". The user's impression is that the system's answer is queer, because the answer to the "lead" is "timpani". However, the user 2 allows the system's answer and continues the game.

In Case 3e in Branch 3, the system 1 erroneously recognizes "lead" as "eat", and moreover determines that the "eat" is correct, whereby the system 1 says a correct answer "timpani". The user's impression is that the system's answer is queer, because the answer to the "lead" is "timpani". Therefore, the user manifests his or her victory and the system 1 strategically manifests its defeat.

In Case 3f in Branch 3, the system 1 erroneously recognizes "lead" as "meat", and notices that "meat" is wrong. However, the system 1 allows the user's mistake and continues the game by saying a correct word "trump".

In Case 3g in Branch 3, the system 1 erroneously recognizes "lead" as "meat", and noticing the "meat is wrong. Therefore, the system 1 manifests its victory.

In Case 3h in Branch 3, the system 1 erroneously recognizes "lead" as "meat", and noticing the "meat is wrong. However, the system 1 manifests its defeat intentionally.

In Branch 4 as shown in FIG. 5, the system 1 first says "apple" against which the user 2 says a coined word, e.g., "excey".

In Case 4a in Branch 4, the system 1 erroneously recognizes "ehet" as correct answer "eat" and says "timpani". The user 2 feels queer, but allows the system's answer and continues the game.

In Case 4b in Branch 4, the system 1 erroneously recognizes "ehet" as correct answer "eaton" and says a correct answer "nectar". Because the user does not notice the system's incorrect recognition, the game is continued.

In Case 4c in Branch 4, the system 1 erroneously recognizes "ehet" as the second "eat", and manifests its victory. On the other hand, the user asserts that it is correct. As a result, the system 1 selects a strategic defeat, if necessary.

In Case 4d in Branch 4, the system 1 erroneously recognizes "ehet" as "bean", and moreover determines the answer is wrong. However, the system 1 allows the mistake of the user in order to continue the game and then says "nectar" which is a correct answer to "bean". Therefore, the game becomes undecided, thereby continuing the game.

In Case 4e in Branch 4, the system 1 erroneously recognizes "ehet" as "bean", and moreover notices that the answer is wrong. Therefore, the system 1 manifests its victory. However, if the user 2 is not persuaded, the game becomes undecided and the system 1 decides the game, if necessary.

In Case 4f in Branch 4, the system 1 erroneously recognizes "ehet" as "bean", and moreover notices that the answer is wrong. However, the system 1 selects the intentional defeat, by saying a wrong verse "network from a prohibited genre.

Embodiment 2

Embodiment 2 corresponds to Feature 2 as stated in the summary of the invention which can select a suitable reply pattern corresponding the game circumstances, thereby preventing the user from feeling tiresomeness and displeasure.

Figure 6:
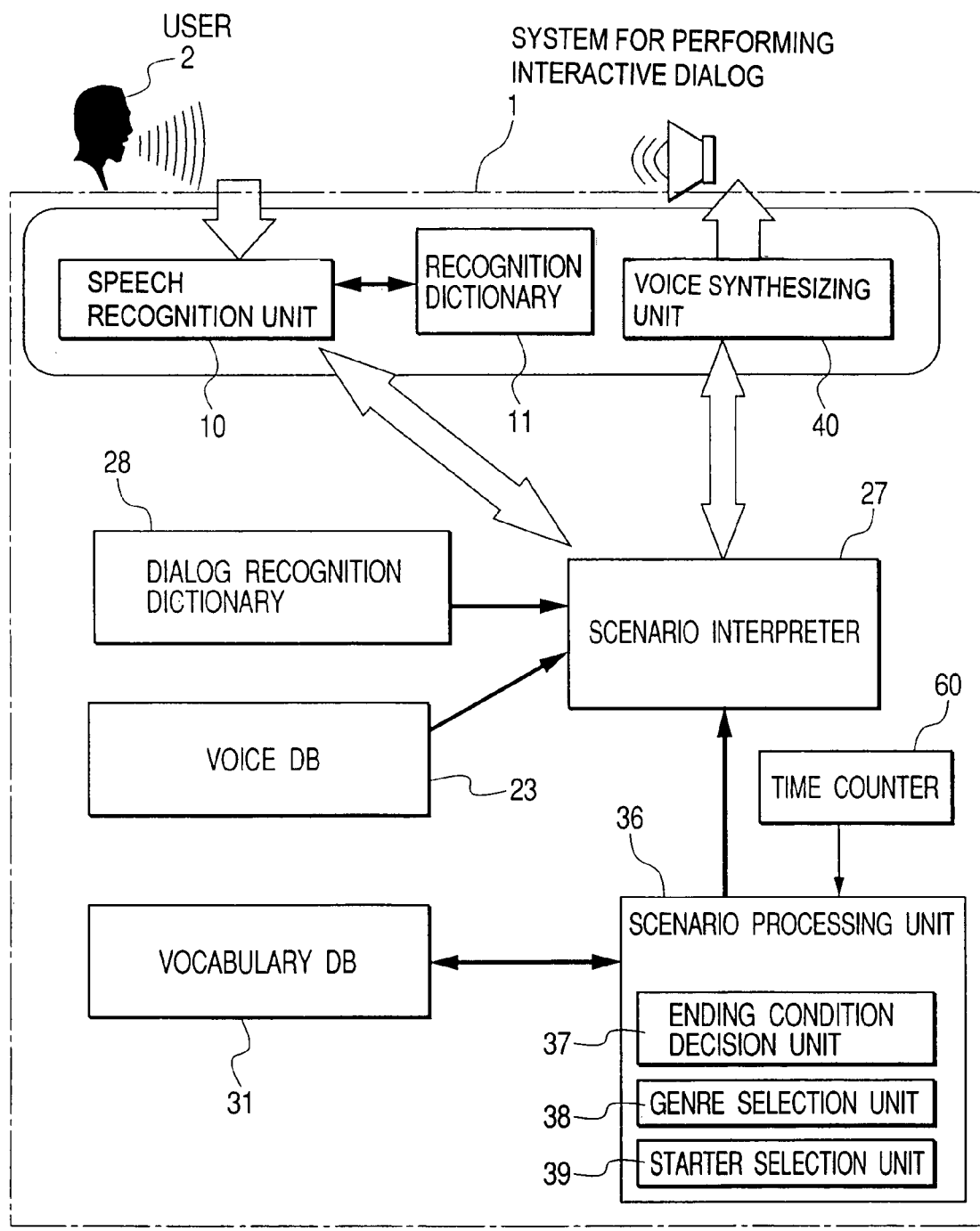
FIG. 6 is a block diagram of the system for performing interactive dialog of Embodiment 2 of the present invention which can select a suitable reply pattern corresponding to the game circumstances, thereby preventing the user from feeling tiresomeness and displeasure.

FIG. 6 is a block diagram of the voice interactive computer system (e.g., a word chain game system) of Embodiment 2 which comprises: a speech recognition unit 10; a recognition vocabulary 11; a scenario interpreter 27; a scenario processing unit 36; a vocabulary database 31; a voice synthesizing unit 40; and time counter 60.

Further, the scenario processing unit 36 comprises: a game ending condition decision unit 37; a genre selection unit 38; and a starting order selection unit 39.

Here, the scenario interpreter 27 correspond to the dialog management unit 20 as shown in FIG. 2 and to a combination of the selection unit 200 and the evaluation unit 500 as shown in FIG. 1, while the scenario processing unit 36 corresponds to the word chain processing unit 30 as shown in FIG. 2 and to the evaluation unit 500 as shown in FIG. 1.

The user's voice is inputted through a not-shown microphone into the speech recognition unit 10 which recognizes the voice, referring to a recognition dictionary 11, and outputs the recognition result to the scenario interpreter 27.

The scenario processing unit 36 stores a plurality of scenarios which express game flows such as condition branches of, e.g., a word chain game. The scenario processing unit 36: refers to a recognition result by the scenario interpreter 27, vocabularies and their heads & endings stored in the vocabulary database 31; evaluates the dialog with the user 2; generates a scenario for a speech; and outputs the scenario to the scenario interpreter 27.

Further, a dialog recognition dictionary 28 and voice database 23 are connected with the scenario interpreter 27.

Here, in the ending condition decision unit 37, one of the ending conditions (among a prescribed number of dialogs, a prescribed time interval between both way dialogs, a prescribed prohibiting word for ending the game) is decided by using a random number. The user 2 does not become tired of the game, due to the ending condition.

Further, the genre selection unit 38 allows the user 2 to select a genre, thereby limiting the vocabulary. The genre selection is advantageous, because the system 1 becomes simple, while it is disadvantageous for the user 2, because the user 2 can not answer easily.

Further, the starting order selection unit 39 allows the user 2 to decide the one which or who starts the game.

The scenario interpreter 27 generates the speech in accordance with the scenario, referring to the dialog recognition dictionary 28 for storing words used in the dialog or game and to the voice database 23 for storing sentences for the speeches.

Thus, the speech generated by the scenario interpreter 27 is outputted to the synthesizing unit 40 for outputting a voice sound from a speaker.

Words and their heads & endings for, e.g., a word chain are expressed by the eXtensible Markup Language (XML) in such a manner that a word, e.g., "orange" is labeled by <SHIRITORI WORD="orange"/>, its head is labeled by <FRONT WORD="o"/> and its ending is labeled by <BACK WORD="e"/>.

If the user 2 said "gorilla", the system 1 searches "a", or "la" (in accordance with the game rule: hereinafter in Embodiment 2 the last syllable "la" shall be searched) among the <FRONT> tag. Further, a word which has not yet been used in the dialog is selected, in accordance with such a game rule, e.g., that the same word shall not be used twice.

The game rule for the word chain in Embodiment 2 follows the verse capping between persons in Japanese language. For example, the same word shall not be used twice. The word ending shall not be "nn", because there is not any word beginning "nn". The person who could not answer any more shall be defeated.

However, the word chain between the user 2 and system 1 is characterized in that the system may possibly recognizes incorrectly the human pronunciation and the human pronunciation becomes unclear under noises.

Therefore, even if the system 1 thinks that the user's word is queer, it is better to avoid to manifest the user's defeat and to await a correct answer from the user 2. Thus, it is prevented that the user 2 gets irritated by repeated manifests of defeat. Further, it is prevented that the game is suddenly finished. However, if the system 1 merely waits for the user's answer, doing nothing, the user 2 may suspect that the system 1 is stopped. Therefore, it is better to devise that the system 1 prompts the user 2 to answer, by outputting such a prompt sentence as "Your turn.", "Say quick a word beginning from "la".". Thus, the system 1 finishes the game suddenly, while the user 2 becomes displeased.

Figure 7:
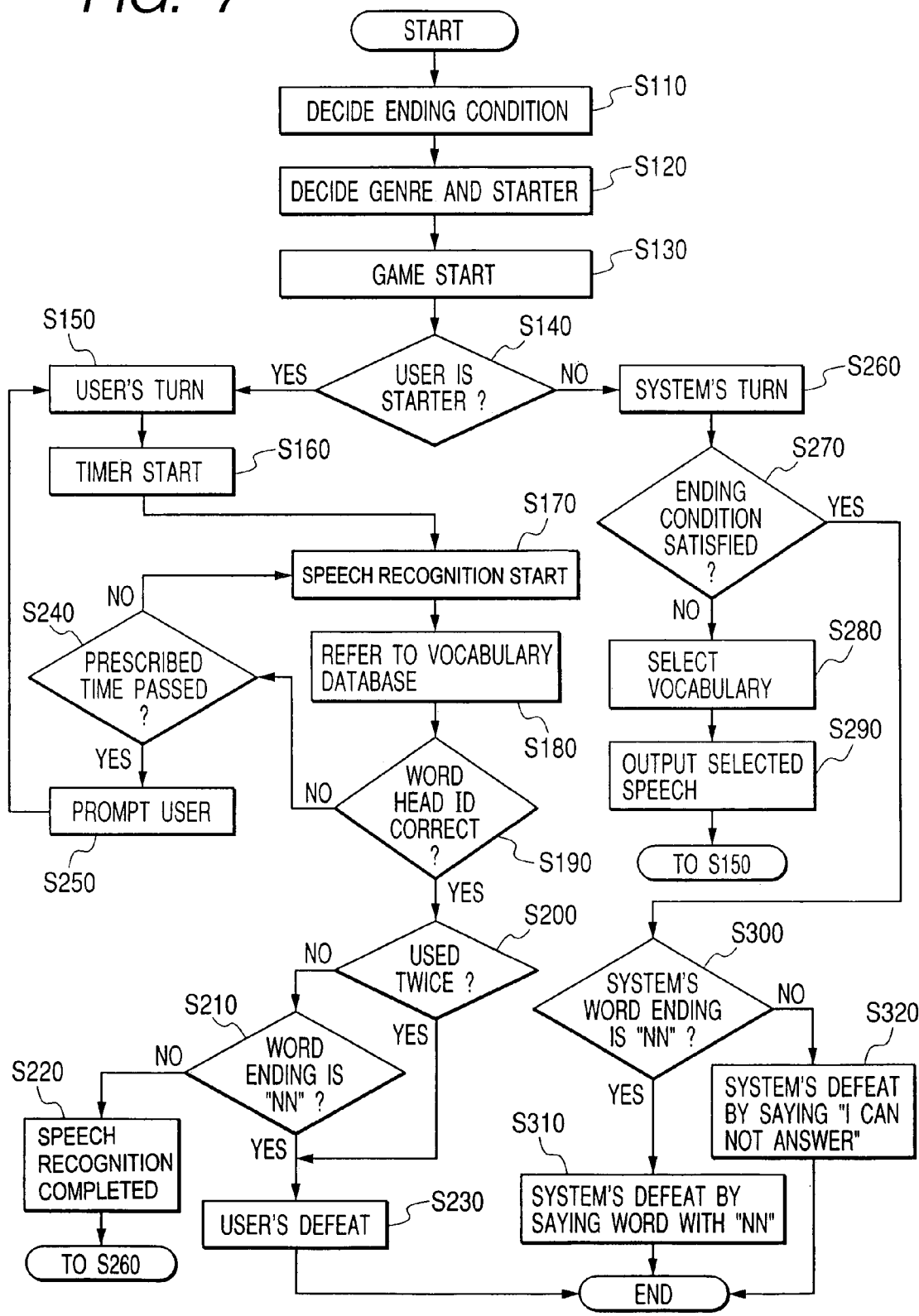
FIG. 7 is a flow chart of the operation of the system for performing interactive dialog of Embodiment 2.

FIG. 7 is a flow chart of the operation of the system 1.

The system 1 starts up and first, a game ending conditions is selected by the user 2 for the game ending condition decision unit 37 at S110 as shown in FIG. 7.

Next, at S120, a genre and a game starting order are selected by the user 2 for the genre selection unit 38 and starter decision unit 39, respectively. Thus, the game is started at S130.

If the user 2 is a starter at S140 (YES), the user's turn follows at S150, while the system 1 is a starter at S140 (NO), the system's turn follows at S260.

Following S150, the time counter 60 starts counting a time lapse at S160 and the speech recognition unit 10 starts recognizing the user's word at S170. The scenario interpreter 27 refers at S180 to the vocabulary database 31 and determines at S190 whether or not the word head is correct. If the word head is correct at S190 (YES), S200 follows, while if the word head is wrong at S190 (NO), the system 1 waits again the user's word during a prescribed time interval at S240. Following S240, when the prescribed time interval has passed, a prompt sentence for prompting the user 2 to answer is outputted at S250 and S150 follows.

Following S190, when it is determined that the user's word is used for the first time at S200 (NO), it is determined whether or not the word ending is "nn", If the word ending is determined to be "nn" at S210 (YES), then, the system 1 manifests its victory at S230. On the contrary, if the word ending is determined not to be "nn" at S210 (NO), then, the user's word is recognized at S220 by the speech recognition unit 10 and the user's turn S260 follows.

At the user's turn S260, the game ending condition is checked at S270.

If the ending condition is not satisfied at S270 (NO), the answering word is selected from the vocabulary database 31 at S280. The answering word is outputted at S290 by using one of the various speech patterns. Then, the user's turn S150 follows.

On the contrary, if the ending condition is satisfied at S270 (YES), it is determined whether or not there is in the vocabulary database a word with a prescribed ending, e.g., "nn" (in case of a Japanese word chain) at S300. If there is a "nn" ending word at S300 (YES), the system 1 manifests its defeat by outputting the "nn" ending word at S310. The system 1 is also defeated by outputting at S320 such a sentence as "I don't know the word with "nn" head, even if there is not a word with "nn" head at S300 (NO). This is because the user 2 is apt to become displeased, if the user 2 is defeated, in spite of fighting during a long time period.

Several answering sentences outputted at S290 are exemplified. The exemplary sentence 1 is a mere repetition of the selected verse "xxx". The exemplary sentences 2, 3 and 4 are such sentences together with the selected verse of the system 1 "xxx" and user's word "yyy" that: "yyy, isn't it. then, xxx." (exemplary sentence 2); "you said, yyy, didn't you? then, my answer is xxx." (exemplary sentence 3); or "yyy? difficult! er . . . then, xxx." (exemplary sentence 4). Further, words with smaller number of letters may be outputted under a little long interval between the letters. The interval between the words in the sentence may be made a little long as well as inserting "er", thereby bringing about such an atmosphere that the system 1 is thinking.

Further, a concrete word chain dialog in Japanese (corresponding English word is in the parenthesis) is shown.

| | |
|---|---|
| System: 1 | Select food or animal. |
| User: 1 | Food. |
| System: 2 | Decide the starter. |
| User: 2 | You. |
| System: 3 | I am the starter, am I. |
| | Now, from me, ringo (apple). |
| User: 3 | Goma (sesame). |
| System: 4 | Goma, isn't it? |
| | Now, masukatto (muscat). |

-continued

| User: 4 | Tomato (tomato). |
| System: 5 | Togarashi (red pepper). |
| User: 5 | Shio (salt). |
| System: 5 | Did you say Shio? |
| | Now, okura (gumbo). |
| User: 6 | Raichi (litchi). |
| System: 6 | Raichi, is it? |
| | Now, Chikuwa (roast fish paste) |
| . | |
| . | |
| . | |
| User: 7 | Kurumi (walnut). |
| System: 7 | Kurumi, is it? Now, Mikann (orange). |
| | Damn it! "nn"!. You won. |

In System: 4, the system 1 does not merely said "Goma", but said a statement including "Goma", referring to the voice database 23, whereby the user may be more pleased, compared with the mere output of the user's word.

Further, in System: 7, the system 1 finished the game by manifesting its defeat, in accordance with the game ending condition which limits the number of the both way dialogs, thereby preventing the user 2 from becoming displeased, if he or she is defeated, in spite of a long time effort to win.

Embodiment 3

Embodiment 3 corresponds to Feature 3 as state in the summary of the invention which can execute an intellectual and natural dialog in such a manner that the voice output is adaptively changed, depending upon the dialog situations, thereby satisfying user's curiosity and intelligence.

Figure 8:
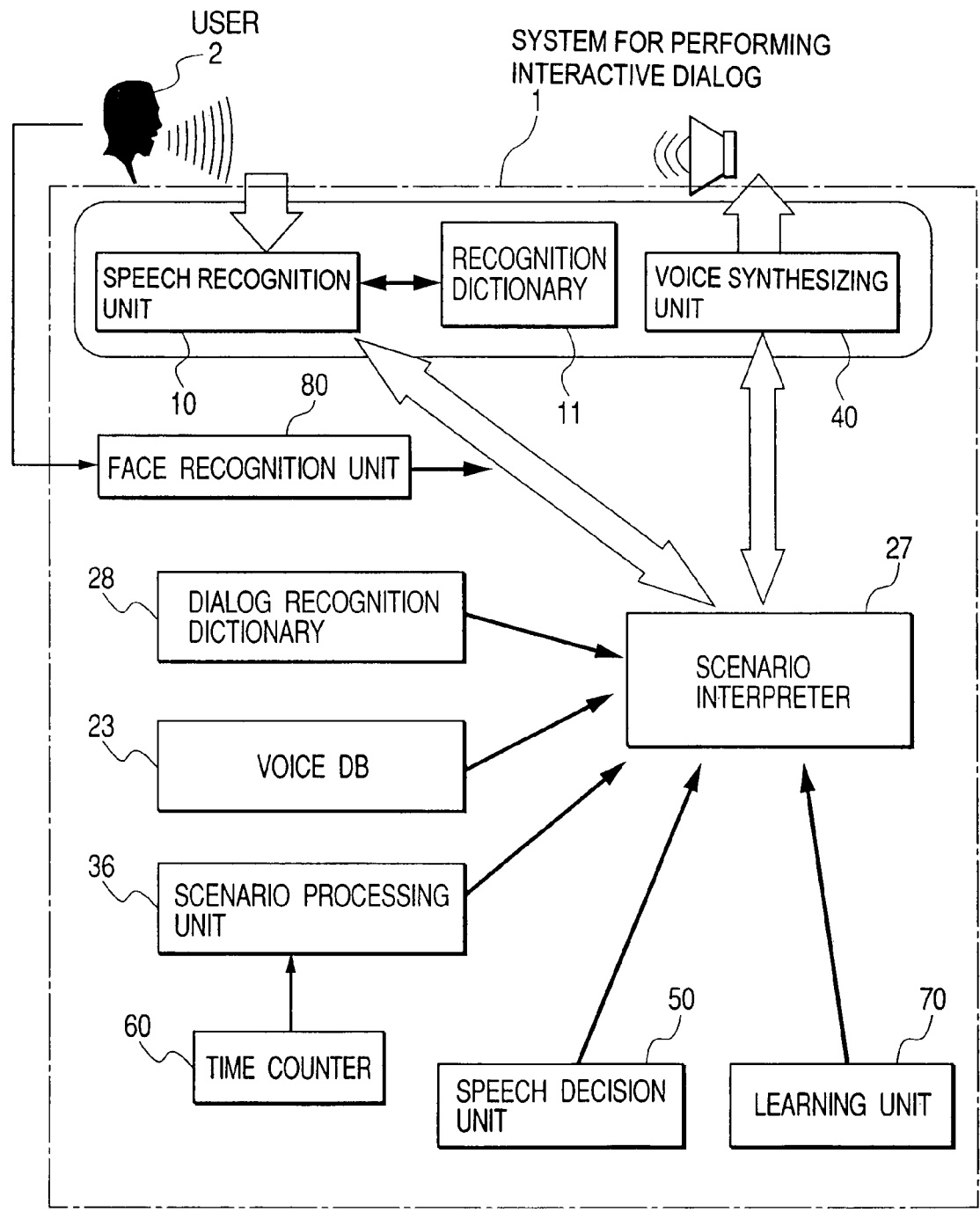
FIG. 8 is a block diagram of the system for performing interactive dialog of Embodiment 3 which can execute an intellectual and natural dialog in such a manner that the voice output is adaptively changed, depending upon the dialog situations, thereby satisfying user's curiosity and intelligence.

FIG. 8 is a block diagram of the interactive voice computer system which comprises: a speech recognition unit 10; a recognition dictionary 11; a scenario interpreter 27; a scenario processing unit 36; a voice synthesizing unit 40; a speech decision unit 50; a time counter 60; learning unit 70; and face recognition unit 80.

Here, the scenario interpreter 27 correspond to the dialog management unit 20 as shown in FIG. 2 and to a combination of the selection unit 200 and the evaluation unit 500 as shown in FIG. 1, while the scenario processing unit 36 corresponds to the word chain processing unit 30 as shown in FIG. 2 and to the evaluation unit 500 as shown in FIG. 1.

Further, the system 1 is provided with a not-shown camera for recognizing the user's face. Further, the system 1 may be provided with a plurality of cameras so as to recognize the user's face, even when the user talks from the backward of the system 1. Two of them are the system's eyes. Further, a plurality of not-shown directional microphones may be provided in such a manner that two of them are the system's ears.

The user's voice is inputted through a not-shown microphone, or not-shown directional microphones. Particularly, the system 1 can analyzes by using the directional microphones whether or not the user 2 talked toward the system 1, or analyze the user's direction. Further, the face recognition unit 80 determines the position and direction of the user 2 and improves an accuracy of above mentioned analysis.

The user's voice is inputted into the speech recognition unit 10 which recognizes the voice, referring to a recognition dictionary 11, and outputs the recognition result to the scenario interpreter 27.

The scenario processing unit 36 stores a plurality of scenarios which express game flows such as condition branches. The scenario processing unit 36: refers to a recognition result by the scenario interpreter 27, a time lapse counted by the time counter 60; generates a suitable scenario for a speech; and outputs the scenario to the scenario interpreter 27.

The scenario interpreter 27 generates the speech in accordance with the scenario, referring to the dialog recognition dictionary 28 for storing words used in the dialog or game and to the voice database 23 for storing sentences for the speeches.

Further, the scenario interpreter 27 interrogates the user 2 of the answering verse to the user's answer, if the system 1 can not find the answer, in spite of searching the dialog recognition dictionary 28 and voice database 23. The answer to the system's interrogation is learned by the learning unit 70, thereby updating the dialog recognition vocabulary 21, voice database 23 and scenario processing unit 36. Thus, the scenario, dialog database and voice database are improved in order to suitably and suitably dialogue with the user 2.

Thus, the speech decision unit 50: decides a suitable speech including a new learned scenario learned and stored in the scenario processing unit 36; and outputs the decided speech from the voice database through the scenario interpreter 27 to the synthesizing unit 40.

Here, the leaning function of the system 1 is explained in more detail. The system 1 is often confronted by what it can not answer (what is not stored as a scenario). Therefore, the system is forced, first, to interrogate the answer which the user 2 supposes, thereby the system 1 can learns the answer and its content. Thereafter, the system 1 becomes knowledgeable about what the system 1 has not know and can answer. However, what the system 1 learned may possibly be wrong. Further, the newly learned knowledge is improved gradually as the system 1 experienced various dialogs. Further, the answer to a question is diversified by learning. By using the learning function, the system 1 may selects an answer of which emersion probability is the highest. Further, the system 1 may give a priority on an earlier answer, if the probabilities are equal. Thus, the learning function makes the system 1 to learn what it did not know, thereby approaching a correct answer.

Here, further, the speech function of the system 1 is preferably provided with a natural way of speaking and adaptive response to the dialog situation. The response may be adaptive to the response time period, way and content of the user's answer, user's sentiment and user's provincialism.

Next, the operation of the system 1 is explained. The system 1 works in accordance with the scenario generated by the scenario processing unit 36, in such a manner that the system 1 awaits the user's responses at the branch points in the scenario; obtains the user's responses; outputs the system's responses, following the processing flows as explained later; repeating those operations; and finally completes one of both way dialogs. Thus, the dialog is ended in accordance with the scenario.

Figure 9:
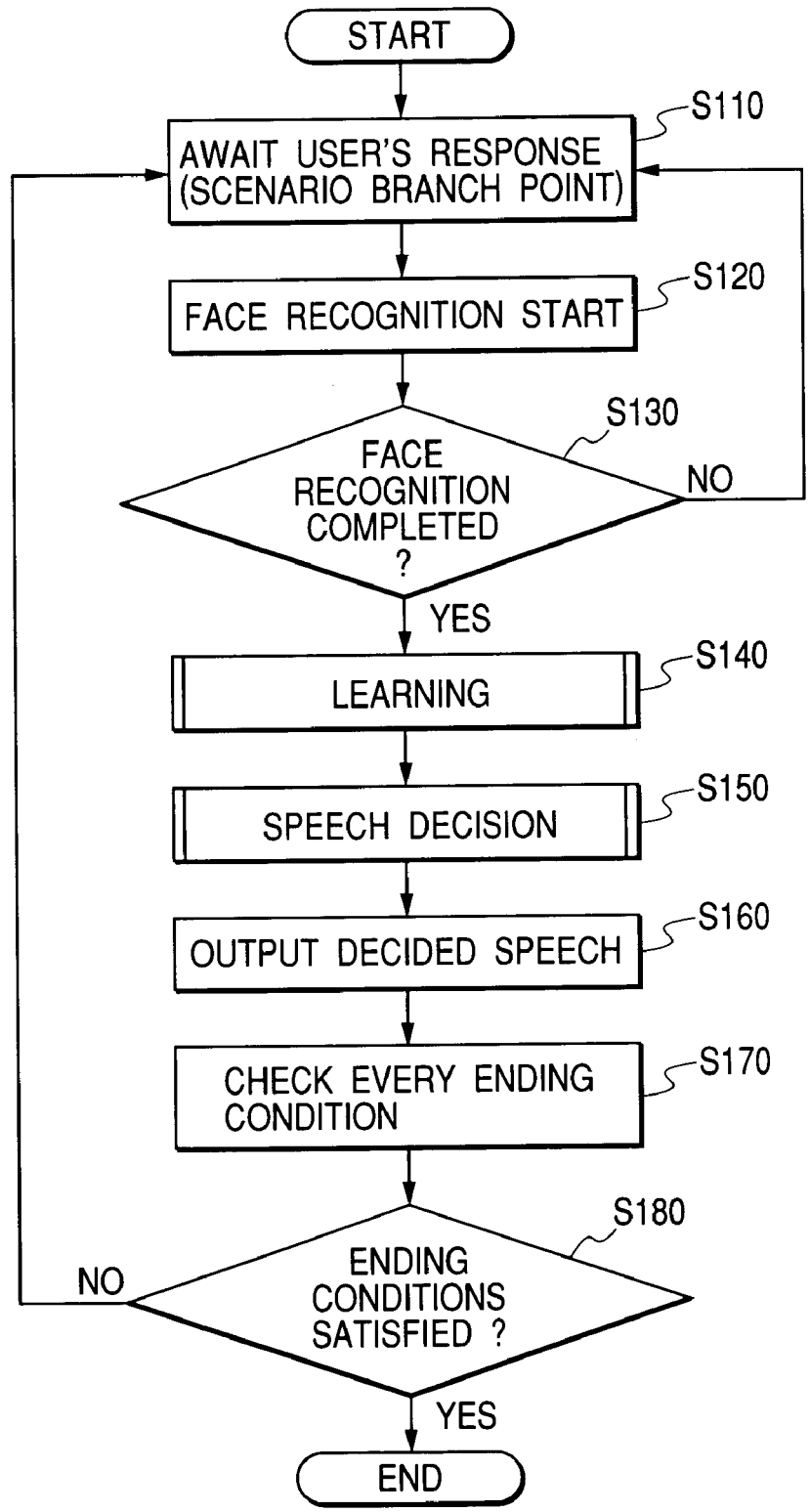
FIG. 9 is a flow chart of the operation of the system for performing interactive dialog of Embodiment 3.

FIG. 9 is a flow chart of overall operations at every branch points.

At a scenario branch points, the system 1 awaits and obtains the user's voice response at S110. Then, the face recognition of the user 2 is executed at S120.

Figure 10A:
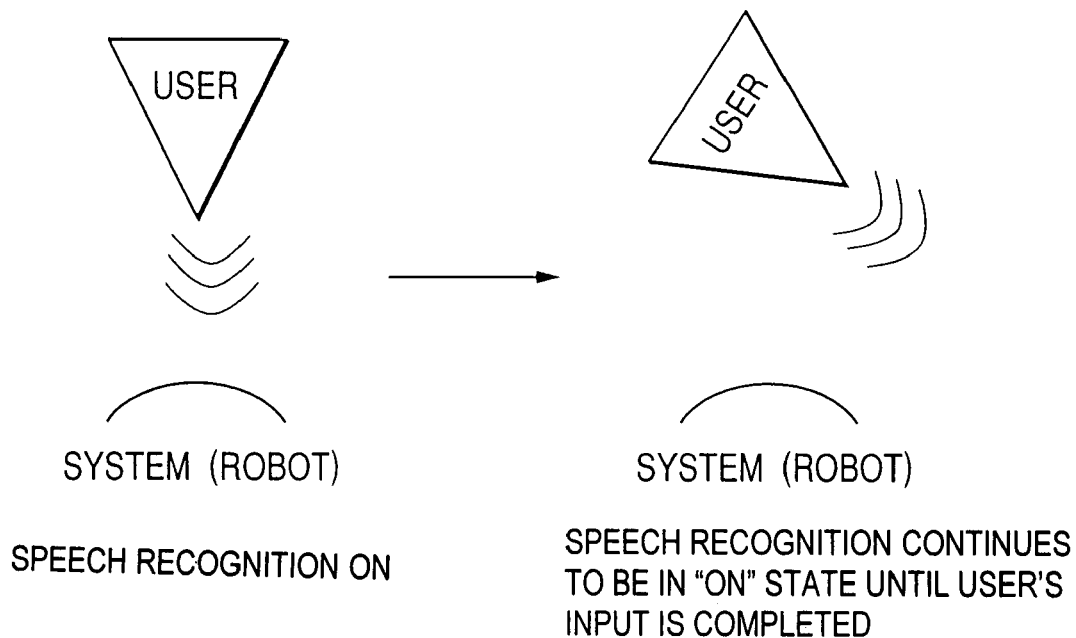
FIGS. 10A and 10B are illustrations for the face recognition function.
Figure 10B:
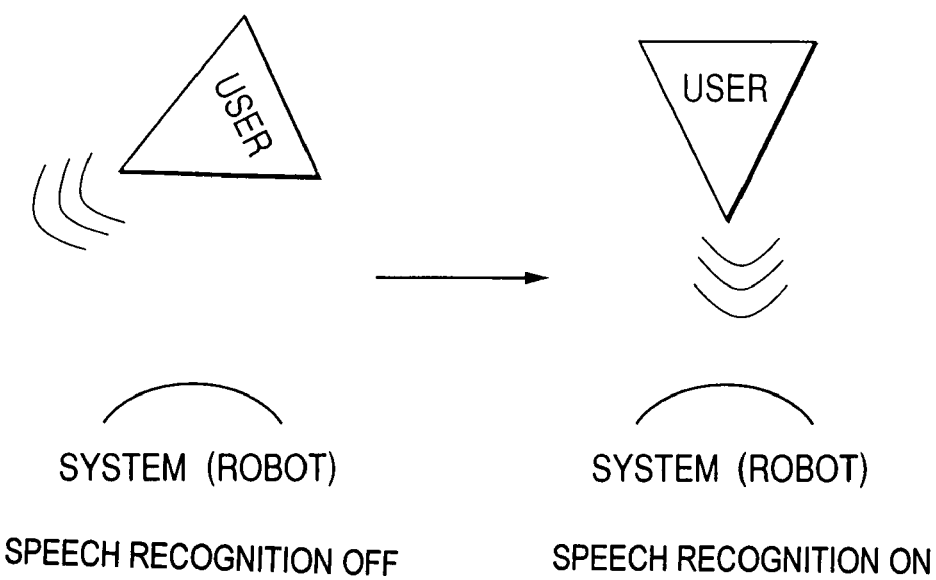

The face recognition at S120 is started, when the user talks toward the cameras (system's eyes) as shown in FIG. 10A. the face recognition is not interrupted before the user's speech is completed, even when the user turns the face away. On the other hand, as shown in FIG. 10B, the speech recognition is not started, when the face is not directed toward the system 1. However, when the face is directed toward the system 1, the speech recognition is started. Even the user's voice from the backward of the system can be captured by the cameras and directional microphones disposed at a prescribed distance around 360 degrees surrounding the user 2. Therefore, the speech recognition can be started, when the system 1 turns toward the user's direction. Thus, the system 2 recognizes only the dialog between the user 1 and system 1, thereby executing a natural dialog as if it is between persons.

Then, if the face recognition is completed at S130 (YES), the operation flow in accordance with the learning function at S140.

Figure 11:
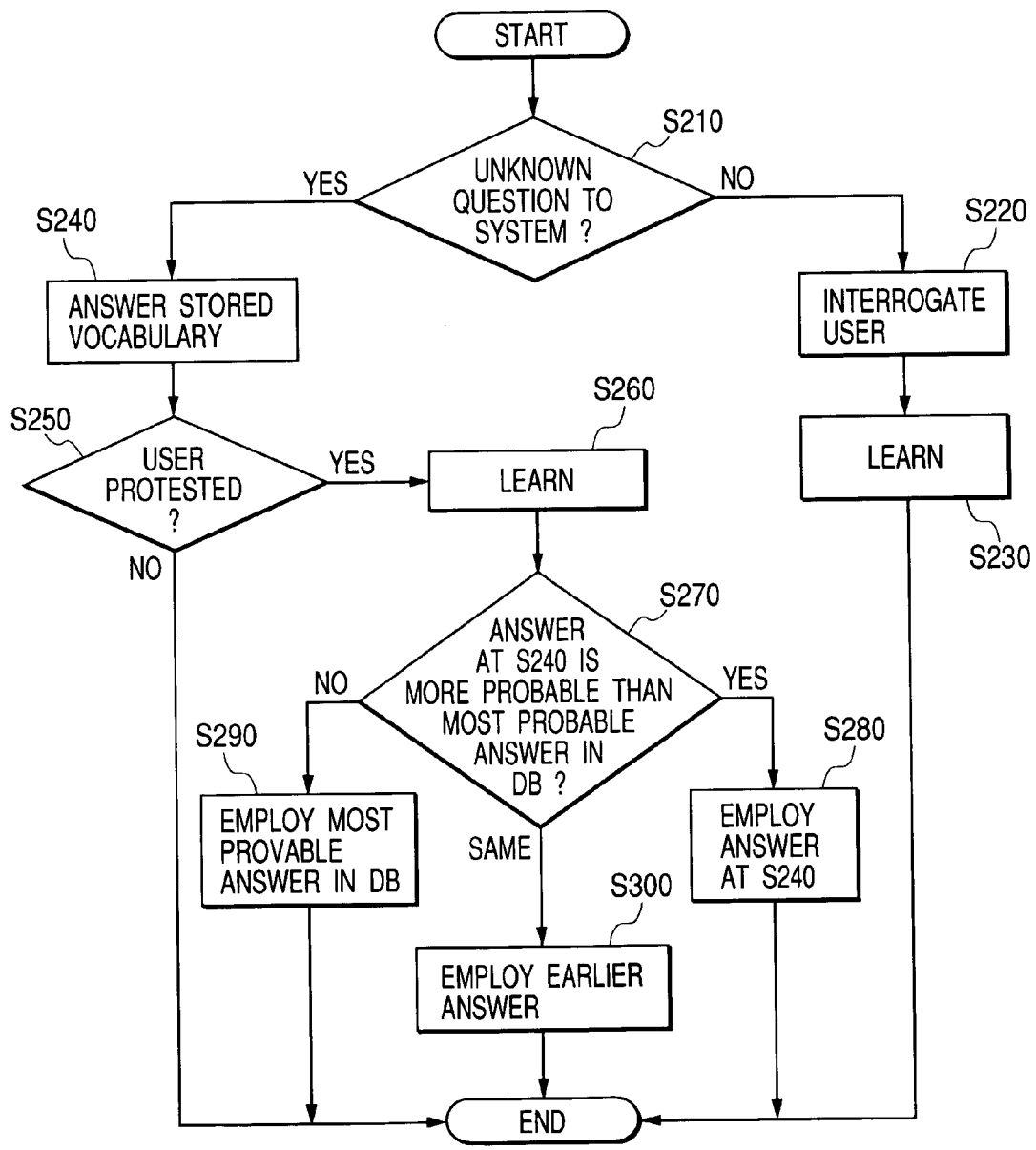
FIG. 11 is a detailed flow chart of the operation in accordance with the learning function of the system for performing interactive dialog of Embodiment 3.

The operation step S140 is explained in detail as S210-S300 as shown in FIG. 11. The operation step S140 is directed to the learning function of the system 1.

Therefore, Steps S210-S300 are explained, here.

At S210, the scenario interpreter 27, referring to the dialog processing unit 30, determines whether or not the system 1 know the answer for the recognized user's voice. If the system 1 does not know at S220 (NO), the system 1 interrogates the user 2 through a synthesized voice at S220. Thus, the answer and content to the interrogation is learned by the learning unit 70 S230. The answer and content (new scenario) are stored through the scenario interpreter 27 in the dialog dictionary 28, voice database 23 and scenario processing unit 36.

On the other hand, if the system knows at least one answer to the verse or sentence by recognized user's voice at S210 (YES), the system 1 answers one of the known answers at S240. Further, if the user did not protest that the answer is wrong at S250 (NO), then the operation is ended.

However, the first answer for the interrogation may possibly be wrong. Therefore, the user 2 may point out that the answer is wrong at S250 (YES), because the user's first answer for the interrogation may be wrong. In this case, step S260 follows in order to learn again the answer unknown to the system 1, by the second interrogation. Following S260, at S270, the most probable answer is searched among the hysteresis stored in the voice database 23.

If the second answer for the second interrogation is determined more probable than the most probable in the hysteresis, the second answer is deemed to be correct, and updating the scenario by re-establishing the second answer as the most probable answer at S280, thereby ending the operation in accordance with the learning function.

S150 as shown in FIG. 9 following S140 is explained in detail in FIG. 12 (S310-S350). S150 is directed to the operation by the speech decision unit 50 in accordance of the intelligent function of the system 1.

First, at S310, S340 and S350, the response time period of the user, the way of answering and contents of the answer are analyzed, respectively, by the speech decision unit 50.

For example, it is assumed that the dialog is on favorite fruits. If the response time is long, e.g., about 10 sec., with the response content "May be, apple.", then the system 1 may output at S330 an ambiguous response as "Really like apple?". On the other hand, if the user 2 replies immediately at S310, the system 1 may outputs at S320 such an emphatic and sympathized response as "you do like apple, don't you."

The speech decision unit 50 observes every nuances of the user's expression and decides (selects) one of the stored speech patterns.

The speech pattern is decided at S150 (S310-S350), and then the decided speech pattern is outputted from the synthesizing unit 40 at S160 as shown in FIG. 9. Then, for the ending condition determination S170, it is determined whether or not the game ending conditions are satisfied at S180. If satisfied at S180 (YES), the operation of the system 1 is ended, while if not satisfied, S110 follows.

Next, several factors on an intellectual and natural voice response by the system 1 are summarized. First, the system preferable recognizes the user's sentiment and adaptively outputs a voice response in such a manner that, e.g., user's anger is responded by system's comfort. Second, objects which caused specific sentiments are preferably considered. Third, the user's provincialism is preferably answered by the same, and topics are preferably be directed to that province and country. Fourth, the pronunciation of the provincialism (including foreign languages) may preferably be realistic. Fifth, the pronunciation may preferably adaptive to age, gender and other things. Sixth, the topics may be directed to the age, gender and the other things. Seventh, the lip reading technique may be applied to the above-mentioned complicated outputs of the system 1. Eighth, speech recognition may preferably be made accurate, e.g., if the user's face position is detected in order to start the speech recognition, only when the user's face is directed in front of the system 1.

In the above-explained fundamental structure and three embodiments, their operations are described by a computer language and read into a CPU or stored in such a memory medium as an optical disc, or hard disc and the like.

Although the three embodiments were explained above, it should be understood that modifications thereof fall within the scope of the present invention.

For example, the system for performing interactive dialog may be constructed as a robot.

Further, the present invention may be applied to a part of a navigation system.

What is claimed is:

1. A computer system for carrying out an interactive dialog with a user of the computer system in accordance with a predetermined rule, comprising:

a data base that stores a dictionary containing a plurality of words and a plurality of phrases;

a recognition unit that recognizes a user's input representing what the user says in response to previous output by the computer system in a currently running interactive dialog and understands what the user says from the user's input by referring to the dictionary stored in the data base;

a determining unit that determines whether a user error occurs in the user's input, the user error representing that the user's input includes a word or phrase that does not meet the predetermined rule in response to the previous output by the computer system;

a selection unit that selects a phrase or word to be used to continue the currently running interactive dialog when the user error occurs in the user's input; and an output unit that outputs the selected phrase or word to the user so as to answer to the user's input, the predetermined rule being defined for a word chain game, the predetermined rule comprising: that the user and the computer system alternate to output a word or phrase which has an initial letter or letters identical with the final letter or letters of the immediately previous output word, the predetermined rule further including:

the output word or phrase has not been used since the beginning of each of interactive dialogs including the currently running interactive dialog for the word chain game, and the output word or phrase does not end with particular predetermined letters, the selection unit selects a phrase or word to be used to terminate the currently running interactive dialog irrespective of the determination of whether the user error occurs in the user's input, thus resulting in a user's win in the word chain game, the selected word or phrase having been used since the beginning of the currently running interactive dialog for the word chain game or ending with the particular predetermined letters, wherein, when it is determined that the user error occurs in the user's input, the selection unit estimates an impression of the user's input based on at least one previous interactive dialog for the word chain game, allows the user error based on the estimated impression of the user's input, and selects the phrase or the word to be used to continue the currently running interactive dialog.

2. The computer system according to claim 1, the user's input including a new word and a new phrase, the new word and the new phrase not being contained in the dictionary, further comprising:
a learning unit that learns the new word and the new phrase included in the user's input, when the recognition unit does not recognize the user's input because the new word and new phrase are not contained in the dictionary; and
a data base updating unit that updates the dictionary so that the new word and the new phrase are contained in the dictionary.

3. The computer system according to claim 2, further comprising:
a scenario interpreter that controls a flow of the interactive dialog based on a history of the user's inputs such that topics of the interactive dialog are directed to preferences of the user,
wherein the selection unit selects words to output to the user, based on the current topics of the interactive dialog, to ensure that the interactive dialog is to be continued even when the computer system fails to recognize the user's input and finds that the user's input indicates that the user made the occurrence of the error in response to the computer system's previous output to the user.

4. The computer system according to claim 3, further comprising:
an anticipating unit that anticipates a future response from the user if the word selected by the computer system be received and responded by the user.

5. The computer system according to claim 4, wherein the data base further stores a plurality of words, each word having an indication of a degree of difficulty, further comprising:
a dialog management unit that stores the user's attributes, wherein
the selection unit selects the words or the phrases for answering to the user's input to those which have a degree of difficulty within a range of degrees of difficulty set up in accordance with the user's attributes.

6. The computer system according to claim 3, further comprising:
a timer that counts an elapsed time after the output unit outputs the selected word selected by the selection unit to the user,
wherein the determining unit evaluates the degree of a user's satisfaction with a currently proceeding dialog between the user and the computer system taking into account the elapsed time counted by the timer.

7. The computer system according to claim 3, further comprising:
a counter that counts a number of occurrences of an error by the computer to the word outputted by the user,
wherein the selection unit selects a wrong word that breaks the rule of the word chain game such that the user is a winner of a word chain game, if the number of occurrences of an error by the computer becomes greater than a predetermined number.

8. The computer system according to claim 1, wherein
the data base of the computer system further stores a plurality of series of words which are chained in accordance with the rules of a word chain game, and
the selection unit selects the word to output to the user by referring to the plurality of series of words stored in the data base in order not to terminate the word chain game due to a difficulty for searching a next word.

9. The computer system according to claim 1, wherein the recognition unit recognizes the user's input representing what the user says in response to the previous output by the computer system in the currently running interactive dialog, understands what the user says from the user's input by referring to the dictionary stored in the data base, and estimates an impression of the user based on a response time of the user's input in response to the previous output by the computer system in the currently running interactive dialog, the response time being defined as a time period from a time when the computer system has outputted a word or phrase as the previous output in response to a previous user's input to a further time when the user's input is received by the computer system, and
wherein the selection unit selects, based on the estimated impression, a phrase or a word to be used to continue the currently running interactive dialog in response to the user's input.

10. A computer readable memory medium storing a computer program that is executed by a computer system to implement a method for carrying out an interactive dialog with a user of the computer system in accordance with a predetermined rule, the computer system having a data base that stores a dictionary containing a plurality of words and a plurality of phrases, said method comprising:
recognizing a user's input representing what the user says in response to previous output by the computer system in a currently running interactive dialog and understanding what the user says from the user's input by referring to the dictionary stored in the data base;
determining whether a user error occurs in the user's input, the user error representing that the user's input includes a word or phrase that does not meet the predetermined rule in response to the previous output by the computer system in the currently running interactive dialog;
selecting a phrase or word to be used to continue the currently running interactive dialog when the user error occurs in the user's input; and
outputting the selected phrase or word to the user so as to answer to the user's input,
the predetermined rule being defined for a word chain game, the predetermined rule comprising: that the user and the computer system alternate to output a word or phrase which has an initial letter or letters identical with the final letter or letters of the immediately previous output word,
the predetermined rule further including:
the output word or phrase has not been used since the beginning of each of interactive dialogs including the currently running interactive dialog for the word chain game, and
the output word or phrase does not end with particular predetermined letters,
the selecting step selects a phrase or word to be used to terminate the currently running interactive dialog irrespective of the determination of whether the user error occurs in the user's input, thus resulting in a user's win in the word chain game, the selected word or phrase having been used since the beginning of the currently running interactive dialog for the word chain game or ending with the particular redetermined letters, wherein, when it is determined that the user error occurs in the user's input, the selecting step estimates an impression of the user's input based on at least one previous interactive dialog for the word chain game, allows the user error based on the estimated impression of the user's input, and selects the phrase or the word to be used to continue the currently running interactive dialog.

11. A method for interactively carrying out an interactive dialog between a user of a computer system and the computer system in accordance with a predetermined rule, wherein the computer system has a dictionary containing a plurality of words and a plurality of phrases, comprising steps of:

recognizing, in a speech recognition unit, a user's input representing what the user says in response to previous output by the computer system in a currently running interactive dialog and understanding what the user says from the user's input by referring to the dictionary stored in the data base;

determining whether a user error occurs in response the user's input, the user error representing that the user's input includes a word or phrase that does not meet the predetermined rule in response to the previous output by the computer system;

selecting a phrase or a word to be used to continue the currently running interactive dialog when the user error occurs in the user's input; and outputting the selected phrase or word to the user so as to answer to the user's input, the predetermined rule being defined for a word chain game, the predetermined rule comprising: that the user and the computer system alternate to output a word or phrase which has an initial letter or letters identical with the final letter or letters of the immediately previous output word, the redetermined rule further includes:

the output word or phrase has not been used since the beginning of each interactive dialog including the currently running interactive dialog for the word chain game, and the output word or phrase does not end with particular predetermined letters, and wherein the determining step determines that the user error does not occur in the user's input when the word or phrase included in the user's input meets the predetermined rule;

the selecting step selects a phrase or a word to be used to terminate the currently running interactive dialog, thus resulting in a user's win in the word chain game, the selected word or phrase having been used since the beginning of the currently running interactive dialog for the word chain game or ending with the particular predetermined letters, wherein, when it is determined that the user error occurs in the user's input, the selecting step estimates an impression of the user's input based on at least one previous interactive dialog for the word chain game, allows the user error based on the estimated impression of the user's input, and selects the phrase or the word to be used to continue the currently running interactive dialog.

12. The method according to claim 11, the user's input including a new word and new phrase, the new word and new phrase not being contained in the dictionary, further comprising steps of:

learning the new word and new phrase included in the user's input, when the recognizing step does not recognize the user's input because the new word and new phrase are not contained in the dictionary; and updating the dictionary so that the new word and new phrase are contained in the dictionary.

13. The method according to claim 12, further comprising a step of:

determining that the currently running interactive dialog is to be continued when the computer system finds that the user's input includes a word or a phrase indicating that the user made an occurrence of an error in inputting the user's input into the computer system.

14. The method according to claim 13, wherein, in the step of determining that the currently running interactive dialog is to be continued, consideration is taken of at least one of a profile of the user, a used words in user's inputs, and response times of the user, the response time is defined as a time period from a time when the computer system has outputted the phrase to the user to answer to a previous user's input to a further time when the user's input is received by the computer system.

15. The method according to claim 14, further comprising:

selecting a wrong word to break a consistency of the currently running interactive dialog so as to discontinue the interactive dialog.

16. The method according to claim 15, further comprising steps of:

learning a new word and a new phrase which is not contained in the dictionary when the user's input is not recognized and not found in the dictionary by asking the user a question about the user's input and receiving a user's response until a recognition of the user's input is accomplished; and updating the dictionary based on a user's response to the question about the user's input asked by the computer system.

17. The method according to claim 12, further comprising a step of:

determining that the currently running interactive dialog with the user is to be continued based on a result of an evaluated consistency of the currently running interactive dialog with the user, wherein even if the user's input includes a word or a phrase that indicates that the user made an occurrence of the error in inputting the user's input to the computer system.

18. The method according to claim 11, further comprising a steps of:

learning a new word when the user's input is not recognized and not found in the dictionary by asking the user a question about the user's input and receiving the user's response until a recognition of the user's input is accomplished; and updating the dictionary based on a user's response to the question about the user's input asked by the computer system.

19. The method according to claim 18, wherein the data base of the computer system further stores a plurality of series of words which are chained in accordance with the rules of the word chain game, and wherein outputting a word for answering the user is selected from those included in the plurality of series of words stored in the data base in order not to terminate the word chain game due to a difficulty for searching for a next word.

* * * * *

UNITED STATES PATENT AND TRADEMARK OFFICE
CERTIFICATE OF CORRECTION

PATENT NO. : 7,640,164 B2  Page 1 of 1
APPLICATION NO. : 10/608002
DATED : December 29, 2009
INVENTOR(S) : Mikio Sasaki et al.

It is certified that error appears in the above-identified patent and that said Letters Patent is hereby corrected as shown below:

On the Title Page

Please correct the title of invention in item (54) of the above-identified Letters Patent to reflect to changes below:

Item (54) VOICE INTERACTIVE COMPUTER SYSTEM

Signed and Sealed this

Thirteenth Day of July, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,640,164 B2 |
| APPLICATION NO. | : 10/608002 |
| DATED | : December 29, 2009 |
| INVENTOR(S) | : Mikio Sasaki et al. |

It is certified that error appears in the above-identified patent and that said Letters Patent is hereby corrected as shown below:

On the Title Page, Item (54) and at Column 1, lines 1 and 2,

Please correct the title of invention in the above-identified Letters Patent to reflect to changes below:

VOICE INTERACTIVE COMPUTER SYSTEM

This certificate supersedes the Certificate of Correction issued July 13, 2010.

Signed and Sealed this

Seventeenth Day of August, 2010

David J. Kappos
*Director of the United States Patent and Trademark Office*